(12) United States Patent
Takahashi et al.

(10) Patent No.: US 11,345,808 B2
(45) Date of Patent: May 31, 2022

(54) EPOXY RESIN COMPOSITION, PREPREG, AND FIBER-REINFORCED COMPOSITE MATERIAL

(71) Applicant: Toray Industries, Inc., Tokyo (JP)

(72) Inventors: Eiki Takahashi, Ehime (JP); Daisuke Konishi, Ehime (JP); Masayuki Miyoshi, Ehime (JP); Noriyuki Hirano, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 268 days.

(21) Appl. No.: 16/628,157

(22) PCT Filed: Jul. 18, 2018

(86) PCT No.: PCT/JP2018/026847
§ 371 (c)(1),
(2) Date: Jan. 2, 2020

(87) PCT Pub. No.: WO2019/017365
PCT Pub. Date: Jan. 24, 2019

(65) Prior Publication Data
US 2020/0140676 A1 May 7, 2020

(30) Foreign Application Priority Data

Jul. 21, 2017 (JP) .............. JP2017-141640
Jul. 21, 2017 (JP) .............. JP2017-141641
Jul. 21, 2017 (JP) .............. JP2017-141642
Jul. 21, 2017 (JP) .............. JP2017-141643

(51) Int. Cl.
| | | |
|---|---|---|
| C08J 5/24 | (2006.01) | |
| C08L 63/04 | (2006.01) | |
| C08L 63/00 | (2006.01) | |
| C08G 59/32 | (2006.01) | |
| C08G 59/38 | (2006.01) | |
| C08G 59/40 | (2006.01) | |
| C08G 59/68 | (2006.01) | |
| C08G 59/46 | (2006.01) | |
| C08J 5/04 | (2006.01) | |
| C08J 5/10 | (2006.01) | |
| B32B 27/26 | (2006.01) | |
| B32B 27/38 | (2006.01) | |
| C08K 5/21 | (2006.01) | |
| C08K 5/55 | (2006.01) | |

(52) U.S. Cl.
CPC .............. *C08L 63/00* (2013.01); *C08G 59/32* (2013.01); *C08G 59/3218* (2013.01); *C08G 59/4021* (2013.01); *C08G 59/46* (2013.01); *C08J 5/046* (2013.01); *C08J 5/10* (2013.01); *C08J 5/24* (2013.01); *C08L 63/04* (2013.01); *C08K 5/21* (2013.01); *C08K 5/55* (2013.01)

(58) Field of Classification Search
None
See application file for complete search history.

(56) References Cited

U.S. PATENT DOCUMENTS

| | | | |
|---|---|---|---|
| 7,005,185 B2 | 2/2006 | Li et al. | |
| 10,266,641 B2 * | 4/2019 | Takaiwa | ............ C08K 3/38 |
| 10,344,117 B2 * | 7/2019 | Sano | ............ C08G 59/02 |
| 11,130,857 B2 * | 9/2021 | Sano | ............ C08G 59/5073 |
| 2015/0299407 A1 | 10/2015 | Harrington | |
| 2017/0291985 A1 * | 10/2017 | Takaiwa | ........ C08G 59/226 |
| 2018/0022862 A1 | 1/2018 | Sano et al. | |
| 2018/0155489 A1 | 6/2018 | Ushiyama et al. | |
| 2019/0211201 A1 * | 7/2019 | Sano | ............ C08L 63/04 |

FOREIGN PATENT DOCUMENTS

| | | | |
|---|---|---|---|
| JP | 10182793 A | 7/1998 | |
| JP | 2002284852 A | 10/2002 | |
| JP | 2003128764 A | 5/2003 | |
| JP | 2006083216 A | 3/2006 | |
| JP | 2016500409 A | 1/2016 | |
| JP | 2016148020 A | 8/2016 | |
| JP | 2016148021 A | 8/2016 | |
| JP | 2016148022 A | 8/2016 | |
| WO | WO-2016129167 A1 * | 8/2016 | ............ C08J 5/24 |
| WO | 2016199857 A1 | 12/2016 | |

OTHER PUBLICATIONS

International Search Report and Written Opinion for International Application No. PCT/JP2018/026847, dated Sep. 18, 2018, 6 pages.

* cited by examiner

*Primary Examiner* — Michael J Feely
(74) *Attorney, Agent, or Firm* — RatnerPrestia

(57) ABSTRACT

The present invention aims to provide an epoxy resin composition that is high in both fast curability and storage stability, a prepreg prepared by using the epoxy resin composition, and a fiber reinforced composite material prepared by curing the prepreg.

The epoxy resin composition contains the following components [A], [B], [C], and [D] and meets the following requirements [a], [b], and [c]:

[A]: epoxy resin,
[B]: dicyandiamide,
[C]: aromatic urea,
[D]: borate ester,
[a]: 0.014≤(content of component [D]/content of component [C])≤0.045,
[b]: 0.9≤(number of moles of active groups in component [A]/number of moles of active hydrogen in component [B])≤1.2, and
[c]: 14≤(content of component [A]/content of component [C])≤25.

21 Claims, No Drawings

EPOXY RESIN COMPOSITION, PREPREG, AND FIBER-REINFORCED COMPOSITE MATERIAL

CROSS REFERENCE TO RELATED APPLICATIONS

This is the U.S. National Phase application of PCT/JP2018/026847, filed Jul. 18, 2018, which claims priority to Japanese Patent Application No. 2017-141640, filed Jul. 21, 2017, Japanese Patent Application No. 2017-141641, filed Jul. 21, 2017, Japanese Patent Application No. 2017-141642, filed Jul. 21, 2017 and Japanese Patent Application No. 2017-141643, filed Jul. 21, 2017, the disclosures of these applications being incorporated herein by reference in their entireties for all purposes.

FIELD OF THE INVENTION

The present invention relates to an epoxy resin composition adapted for use as matrix resin in a fiber reinforced composite material suitable for sport applications, aerospace applications, and general industry applications, and also relates to a prepreg and a fiber reinforced composite material prepared by use thereof as matrix resin.

BACKGROUND OF THE INVENTION

With excellent mechanical properties, heat resistance, and adhesiveness, the epoxy resin is suitably used as a matrix resin for fiber reinforced composite materials formed by combination with reinforcing fibers such as carbon fiber, glass fiber, and aramid fiber.

Sheet-like intermediate base materials (prepregs) produced by impregnating reinforcing fibers with epoxy resin are often used for producing fiber reinforced composite materials. Molded articles can be obtained by a method in which prepreg sheets are laminated and then heated to cure the epoxy resin, and various properties can be developed by different prepreg lamination designs to permit application thereof to various fields such as aircraft and sports goods. In recent years, application to industrial applications such as automobiles has also been advanced, and attention is now attracted to fast cure type prepregs that can be cured in a short time and are suitable for mass production, prepregs that can be easily demolded to enhance process stability, and prepregs that have excellent design appearances and are suitable for outside plates.

On the other hand, since such a fast cure type prepreg contains an epoxy resin with an increased reactivity to realize a shortened curing time, the storage stability and the quality changes that occur in the preforming step often cause problems, and therefore there is a strong call for prepregs having higher stability.

Patent Document 1 discloses an epoxy resin composition and a prepreg that contain a specific aromatic urea as a promoter to serve for producing cured epoxy resin products that are high in fast curability and heat resistance.

Patent Document 2 discloses an epoxy resin composition that shows a high curing rate and serves to produce a cured epoxy resin product having a glass transition temperature of less than 140° C.

Patent Document 3 discloses an epoxy resin composition containing dicyandiamide, aromatic urea, and borate ester, which has high storage stability and serves to produce a cured epoxy resin with good mechanical properties.

Patent Document 4 discloses an epoxy resin composition and a prepreg that contain a liquid aliphatic epoxy resin to serve for producing a cured epoxy resin product having high demoldability.

PATENT DOCUMENTS

Patent document 1: Japanese Unexamined Patent Publication (Kokai) No. 2003-128764
Patent document 2: Published Japanese Translation of PCT International Publication JP 2016-500409
Patent document 3: Japanese Unexamined Patent Publication (Kokai) No. 2016-148020
Patent document 4: Japanese Unexamined Patent Publication (Kokai) No. 2006-83216

SUMMARY OF INVENTION

The epoxy resin composition disclosed in Patent Document 1 has a relatively short curing time and good workability at room temperature, but is not satisfactory in terms of, for example, molding cycle time, storage stability, and workability required for mass production of vehicles. In addition, since aromatic urea having high activity is used, handleability may be decreased as a result of storage of prepregs, progress of curing due to the thermal history in the preforming step, or the like.

The epoxy resin composition disclosed in Patent Document 2 is excellent in fast curability, but fails to have sufficiently high storage stability.

The epoxy resin composition disclosed in Patent Document 3 is excellent in storage stability, but fails to have sufficiently high fast curability. In addition, there is no consideration of the handleability in the preforming step, which is important during the molding of the prepreg.

The epoxy resin composition disclosed in Patent Document 4 is excellent regarding the demolding property of the resulting cured epoxy resin, but neither disclosure nor suggestion is made regarding the simultaneous development of high fast curability and high storage stability.

Thus, an object of the present invention is to provide an epoxy resin composition that overcomes the aforementioned drawbacks of the conventional techniques to achieve both fast curability and storage stability at high levels as well as high handleability in the preforming step, and a prepreg that uses the epoxy resin composition, and also provide a fiber reinforced composite material having good demolding property and high appearance quality.

After making an intensive study aiming to solve the problems described above, the inventors of the present invention found an epoxy resin composition having the following constitution and arrived at the present invention on the basis of the finding. Specifically, the epoxy resin composition according to the present invention meets any one of the following embodiments 1 to 4.

Embodiment 1 is an epoxy resin composition containing the following components [A], [B], [C], and [D] and meeting the following requirements [a], [b], and [c]:
 [A]: epoxy resin,
 [B]: dicyandiamide,
 [C]: aromatic urea,
 [D]: borate ester,
 [a]: 0.014≤(content of component [D]/content of component [C])≤0.045,
 [b]: 0.9≤(number of moles of active groups in component [A]/number of moles of active hydrogen in component [B])≤1.2, and

[c] 14≤(content of component [A]/content of component [C])≤25.

Embodiment 2 is an epoxy resin composition containing components [A], [B], [C], and [D], meeting the following requirement [d], and meeting the requirements 1 and 2:
[A]: epoxy resin,
[B]: dicyandiamide,
[C]: aromatic urea,
[D]: borate ester,
[d]: 0.005≤(content of component [D]/content of component [C])≤0.045, Requirement 1: In dielectric measurement at 80° C., the time period from the start of the measurement until the cure index reaches 10% is 120 minutes or more.

Requirement 2: In dielectric measurement at 150° C., the time period from the start of the measurement until the cure index reaches 70% is 120 seconds or less.

Embodiment 3 is an epoxy resin composition containing components [A], [B], [C], and [D], meeting the requirement [d], and meeting the requirements 3 and 4:
[A]: epoxy resin,
[B]: dicyandiamide,
[C]: aromatic urea,
[D]: borate ester,
[d]: 0.005≤(content of component [D]/content of component [C])≤0.045, requirement 3: the temperature at which the epoxy resin composition exhibits the lowest viscosity when the temperature is raised from 40° C. to 250° C. at a rate of 5° C./minute in dynamic viscoelasticity measurement is 110° C. or more and 140° C. or less, and requirement 4: the difference between the heat generation onset temperature (T0) and the heat generation offset temperature (T1) during the period in which the epoxy resin composition is heated from 30° C. to 300° C. by a differential scanning calorimeter at a constant rate of 5° C./min is 25° C. or less.

Embodiment 4 is an epoxy resin composition containing components [A], [B], [C], and [D], meeting the requirement [e], and meeting the requirements 5 and 6:
[A]: epoxy resin,
[B]: dicyandiamide,
[C]: aromatic urea,
[D]: borate ester,
[e]: 0.9≤(number of moles of active groups in component [A]/number of moles of active hydrogen in component [B])≤1.3, requirement 5: in Curelastometer measurement at 150° C., the demolding index calculated by dividing the maximum torque (TH) by the volume of the sample is 0.40 N·m/cm³ or more and 1.50 N·m/cm³ or less, and requirement 6: in Curelastometer measurement at 150° C., the time tm(70) from the start of the measurement until torque reaches 70% of the maximum torque is 150 seconds or less.

The prepreg according to the present invention includes the aforementioned epoxy resin composition and reinforcing fiber.

In addition, the fiber reinforced composite material according to the present invention is produced by curing the aforementioned prepreg.

The use of the epoxy resin composition according to the present invention makes it possible to provide a prepreg that achieves both fast curability and storage stability and has high handleability in the preforming step and also provide a fiber reinforced composite material that has both good appearance and good demolding property.

DETAILED DESCRIPTION OF EMBODIMENTS OF THE INVENTION

The epoxy resin composition according to embodiments 1 to 4 of the present invention includes component [A], which is an epoxy resin, component [B], which is dicyandiamide, and component [C], which is aromatic urea, and component [D], which is a boric ester, as critical components. First, each of the components is described below.

(Component [A])

Component [A] for the present invention consists of epoxy resins. Examples thereof include glycidyl ether type epoxy resins such as bisphenol A type epoxy resins, bisphenol F type epoxy resins, bisphenol S type epoxy resins, biphenyl type epoxy resins, naphthalene type epoxy resins, novolac type epoxy resins, epoxy resins having fluorene backbones, epoxy resins formed from copolymers of a phenol compound and dicyclopentadiene, diglycidyl resorcinol, tetrakis(glycidyloxyphenyl) ethane, and tris(glycidyloxyphenyl) methane; and glycidylamine type epoxy resins such as tetraglycidyl diaminodiphenylmethane, triglycidyl aminophenol, triglycidylaminocresol, and tetraglycidyl xylene diamine. These epoxy resins may be used singly or as a combination of a plurality thereof.

For the present invention, component [A] preferably contains a tri- or higher polyfunctional epoxy resin. The inclusion of a tri- or higher polyfunctional epoxy resin serves to produce an epoxy resin composition having both high fast curability and high storage stability and also having a high flexural modulus.

From the viewpoint of the balance among fast curability, storage stability, and the flexural modulus of the resulting cured epoxy resin, such a tri- or higher (poly)functional epoxy resin preferably contains, as component [A1], an epoxy resin as represented by the undermentioned formula (I) and/or formula (II): Component [A1] is generally known as phenol novolac type epoxy resin, cresol novolac type epoxy resin, or dicyclopentadiene type epoxy resin, and is commercially available in the form of a mixture of bi- or higher (poly)functional epoxy resins.

Component [A1] preferably accounts for 55 to 100 parts by mass of the total quantity, which represents 100 parts by mass, of the epoxy resins contained in the epoxy resin composition because it serves to provide a cured epoxy resin having a further increased flexural modulus.

[Chemical compound 1]

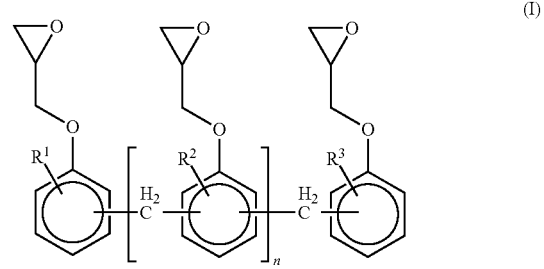

(In formula I, $R^1$, $R^2$, and $R^3$ are each independently hydrogen atom or a methyl group, and n is an integer of 1 or more.)

[Chemical compound 2]

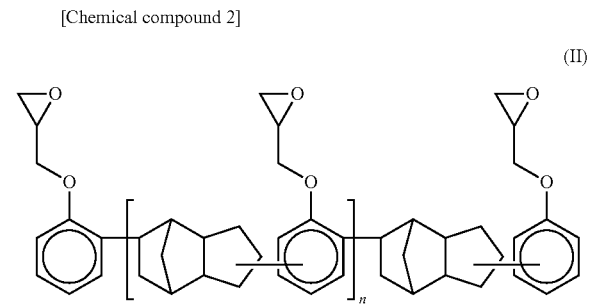

(II)

(In formula II, n is an integer of 1 or greater.)

Commercially available products of component [A1] include XD-1000 (manufactured by Nippon Kayaku Co., Ltd.), jER (registered trademark) 152, 154, and 180S (all manufactured by Mitsubishi Chemical Corporation), Epiclon (registered trademark) N-740, N-770, N-775, N-660, N-665, N-680, N-695, HP7200L, HP7200, HP7200H, HP7200HH, and HP7200HHH (all manufactured by DIC Corporation), PY307, EPN1179, EPN1180, ECN9511, ECN1273, ECN1280, ECN1285, and ECN1299 (all manufactured by Huntsman Advanced Materials Co., Ltd.), YDPN638, YDPN638P, YDCN701, YDCN702, YDCN703, and YDCN704 (all manufactured by Tohto Kasei Co., Ltd.), and DEN431, DEN438, and DEN439 (all manufactured by The Dow Chemical Company).

(Component [B])

For the present invention, component [B] is dicyandiamide. The dicyandiamide is a compound represented by the chemical formula $(H_2N)_2C=N-CN$. The dicyandiamide is widely used as a curing agent for epoxy resins because of its excellent ability to work as a curing agent to produce a cured epoxy resin with good mechanical properties and high heat resistance. Examples of commercially available dicyandiamide products include DICY7 and DICY15 (both manufactured by Mitsubishi Chemical Corporation).

Incorporation of dicyandiamide [B] in the form of powder in an epoxy resin composition is preferable from the viewpoint of its storage stability at room temperature and viscosity stability during prepreg production. Preliminary dispersion of dicyandiamide [B] in part of the epoxy resins used as component [A] by using a three roll mill etc. is preferable from the viewpoint of preparing a uniform epoxy resin composition and producing a cured epoxy resin with improved physical properties.

When powdery dicyandiamide is added to the resin, its average particle size is preferably 10 μm or less, and more preferably 7 μm or less. For example, when reinforcing fiber bundles are impregnated with an epoxy resin composition by applying heat and pressure in the course of prepreg production, the impregnating property of the resin into fiber bundles will be improved if the average particle size is 10 μm or less. Here, the average particle diameter means the volume average, and can be measured by a laser diffraction type particle size distribution measuring apparatus.

The combined use of dicyandiamide [B] with the undermentioned component [C] serves to produce an epoxy resin composition having a lower curing temperature as compared with the single use of component [B]. For the present invention, the combined use of component [B] and component [C] is essential to ensure fast curability.

(Component [C])

For the present invention, component [C] is aromatic urea.

Specific examples of the aromatic urea of component [C] include 3-(3,4-dichlorophenyl)-1,1-dimethylurea (occasionally abbreviated as DCMU), 3-(4-chlorophenyl)-1,1-dimethylurea, phenyldimethylurea (occasionally abbreviated as PDMU), and toluene bisdimethylurea (occasionally abbreviated as TBDMU). Commercial products of aromatic urea include DCMU99 (manufactured by Hodogaya Chemical Industry Co., Ltd.), Omicure (registered trademark) 24 (manufactured by PTI Japan Co., Ltd.), Dyhard (registered trademark) UR505 (4,4'-methylene bisphenyldimethylurea, manufactured by CVC).

(Component [D])

For the present invention, component [D] is a borate ester. The combined use of component [C] and component [D] serves to provide a prepreg having a considerably improved storage stability. Although the mechanism has not been clarified, it is considered that since component [D] has Lewis acidity, the amine compound isolated from component [C] reacts with component [D] to make the amine compound less reactive.

Specific examples of the boric ester used as component [D] include alkyl borates such as trimethyl borate, triethyl borate, tributyl borate, tri-n-octyl borate, tri(triethylene glycol methyl ether) borate, tricyclohexyl borate, and trimenthyl borate; aromatic borates such as tri-o-cresyl borate, tri-m-cresyl borate, tri-p-cresyl borate, and triphenyl borate; and others such as tri(1,3-butanediol) biborate, tri(2-methyl-2,4-pentanediol) biborate, and trioctylene glycol diborate.

The boric ester used may also be a cyclic borate ester having a cyclic structure in its molecule. Examples of the cyclic borate ester include tris-o-phenylene bisborate, bis-o-phenylene pyroborate, bis-2,3-dimethylethylene phenylene pyroborate, and bis-2,2-dimethyltrimethylene pyroborate.

Commercial products that contain such boric esters include Cureduct (registered trademark) L-01B (manufactured by Shikoku Chemicals Corporation), Cureduct (registered trademark) L-07N (a composition containing 5 parts by mass of a borate ester compound) (manufactured by Shikoku Chemicals Corporation), and Cureduct (registered trademark) L-07E (a composition containing 5 parts by mass of a borate ester compound) (manufactured by Shikoku Chemicals Corporation).

The epoxy resin composition according to embodiment 1 of the present invention contains the above components [A], [B], [C], and [D], and meets the following requirements [a], [b], and [c]. Hereinafter, the requirements [a], [b], and [c] will be described in order.

Requirement [a] is a requirement for the ratio between the content of component [C] and the content of component [D], which is expressed by the following formula.

$$0.014 \leq (\text{content of component } [D]/\text{content of component } [C]) \leq 0.045$$

When the ratio of the content of component [D] to the content of component [C] is smaller than this range, the storage stability may not be sufficiently high, and when it is larger than this range, the fast curability may not be sufficiently high. Therefore, if requirement [a] is met, a prepreg having a good balance between fast curability and storage stability can be obtained. The content of component [C] and the content of component [D] mean the amount (parts by mass) of the borate ester of [C] and the amount of the borate ester of [D], respectively, relative to 100 parts by mass of the epoxy resin of component [A].

For the present invention, the storage stability of an epoxy resin composition is evaluated based on the change in the glass transition temperature that occurs while it is stored at 40° C. and 75% RH for 14 days. It is preferable that the change in the glass transition temperature under these conditions is 20° C. or less because the epoxy resin composition serves to produce a prepreg that exhibits high storage stability even at room temperature. Details, including the contents of various components, of the compositions according to embodiments 2 to 4 will be described later, but the preferable ranges relating to storage stability are common among embodiments 1 to 4.

The storage stability of an epoxy resin composition according to the present invention can be assessed by, for example, tracing the changes in glass transition temperature by differential scanning calorimetry (DSC). Specifically, it can be evaluated by storing the epoxy resin composition in, for example, a thermo-hygrostat chamber under the above conditions (40° C., 75% RH, 14 days) with the glass transition temperature of the sample measured before and after the storage period by DSC wherein the sample is heated from −20° C. to 150° C. at 5° C./min, followed by calculating the change in glass transition temperature that occurs between before and after the storage period.

The fast curability of the epoxy resin composition according to the present invention can be represented by the time period required for curing the epoxy resin composition by heating it at a predetermined temperature until demolding becomes possible, and the fast curability increases with a decreasing curing time. For example, it can be evaluated by using a vulcanization/curing properties tester (Type V (Curelastometer, manufactured by JSR Trading Co., Ltd.). Specifically, an epoxy resin composition is prepared and a sample is placed in a die heated at 150° C., followed by applying a torsional stress. Here, the viscosity increase caused by the progress of curing of the sample is assumed to represent the torque transmitted to the die, and the time required to reach 70% of the maximum peak torque is taken as the demoldable time to use for evaluation. The time required to reach 70% of the maximum peak torque is preferably 150 seconds or less, and a sample that meets this requirement can be judged to have a high fast curability.

Requirement [b] is a requirement for the ratio of the number of moles of active groups in component [A] to the number of moles of active hydrogen in the component [B], and it is expressed by the following formula.

0.9≤(number of moles of active groups in component [A]/number of moles of active hydrogen in component [B])≤1.2

If the ratio of the number of moles of active groups in component [A] to the number of moles of active hydrogen in component [B] exceeds this range, the fast curability may decreases to an insufficient level, whereas if it becomes smaller than this range, the resulting cured epoxy resin may fail to have sufficiently good mechanical properties. Therefore, if requirement [b] is met, it will be possible to provide an epoxy resin composition having a good balance between its fast curability and the mechanical properties of the cured epoxy resin to be obtained. Here, the number of moles of active groups in component [A] is the sum of the number of moles of each epoxy resin active group, and is expressed by the following formula.

The number of moles of active groups in component [A]=(mass of resin A/epoxy equivalent weight of resin A)+(mass of resin B/epoxy equivalent weight of resin B)++(mass of resin W/epoxy equivalent weight of resin W)

The number of moles of active hydrogen in component [B] is determined by dividing the mass of dicyandiamide by the active hydrogen equivalent weight of dicyandiamide, and is expressed by the following formula.

The number of moles of active hydrogen in component [B]=mass of dicyandiamide/active hydrogen equivalent weight of dicyandiamide Requirement [c] is a requirement for the ratio between the content of component [A] and the content of component [C], which is expressed by the following formula.

14≤(content of component [A]/content of component [C])≤25

If the ratio of the content of component [A] to the content of component [C] exceeds this range, the fast curability may decrease to an insufficient level, whereas if it becomes smaller than this range, the resulting cured epoxy resin may fail to have sufficiently good mechanical properties. Therefore, if requirement [c] is met, it will be possible to provide an epoxy resin composition having a good balance between its fast curability and the mechanical properties of the cured epoxy resin to be obtained.

Normally, it is difficult for a combination of separate techniques alone to achieve a high fast curability and a high storage stability of an epoxy resin and simultaneously achieve good mechanical properties of the cured epoxy resin to be produced from the resin. The epoxy resin composition according to the present invention contains components [A], [B], [C], and [D], and simultaneously meets requirements of [a], [b], and [c], and this makes it possible to maintain a very good balance among high fast curability, high storage stability, and good mechanical properties. Thus, it is difficult to simultaneously realize high fast curing, high storage stability, and good mechanical properties only by any one of [a] to [c] or a combination of two thereof.

It is preferable that the epoxy resin composition according to embodiment 1 of the present invention further meets any one or a plurality of the following conditions (i) to (iii).

(i) Requirements 1 and 2 are met.
(ii) Requirements 3 and 4 are met.
(iii) Requirements 5 and 6 are met.

Each requirement will be described below.

About Condition (i)

Requirement 1: In dielectric measurement at 80° C., the time period from the start of the measurement until the cure index reaches 10% is 120 minutes or more.

Requirement 2: In dielectric measurement at 150° C., the time period from the start of the measurement until the cure index reaches 70% is 120 seconds or less.

Here, the cure index, which is used to set up requirements 1 and 2, is an indicator of the degree of cure of a thermosetting resin represented by the time dependence of the ion viscosity that can be determined based on, for example, dielectric measurements taken at a predetermined temperature using a MDE-10 cure monitor manufactured by Homometrix-Micromet. In the case of epoxy resin compositions, the ion viscosity first decreases after the start of curing and then, after reaching a minimum, increases as the curing progresses. When calculating the cure index, it is assumed that the minimum value is 0% whereas the saturation value (maximum) of 100% is reached when the curing is completed. A longer time required for the cure index to reach 10% after the start of the measurement at a certain temperature means that the epoxy resin composition at that temperature is more stable (its curing reaction is slow). Since the preforming step is usually performed in the temperature range from room temperature to 80° C., the stability of the prepreg in the preforming step can be determined based on the time period required for the cure index to reach 10% after the start of the measurement at 80° C. Therefore, this means that if requirement 1 is met, the epoxy resin cures very slowly at the temperature of the preforming step, making it possible to obtain an epoxy resin composition that serves to produce a prepreg having very high moldability in the preforming step to stabilize the step.

On the other hand, a shorter time required for the cure index to reach 70% after the start of the measurement at a certain temperature means that the curing reaction of the epoxy resin composition can progress faster at that temperature. Since an epoxy resin composition containing components [A], [B], [C], and [D] according to the present invention is usually cured at 100° C. or more, the fast curability of the epoxy resin composition can be determined based on the time period required for the cure index to reach 70% after the start of the measurement at 150° C. Accordingly, meeting requirement 2 means that the epoxy resin composition is high in fast curability.

Thus, it is preferable that requirements 1 and 2 are met, because in that case, the epoxy resin hardly cures at the temperature of the preforming step, making it possible to obtain an epoxy resin composition that serves to produce a prepreg having very high moldability in the preforming step while showing high fast curability in the curing step.

About Condition (ii)

Requirement 3: The temperature at which the epoxy resin composition exhibits the lowest viscosity when the temperature is raised from 40° C. to 250° C. at a rate of 5° C./minute in dynamic viscoelasticity measurement is 110° C. or more and 140° C. or less.

Here, dynamic viscoelasticity measurement (hereinafter occasionally abbreviated as DMA) of an epoxy resin composition can be performed by using a rheometer (rotational type dynamic viscoelasticity measuring device), and the temperature at which it shows the minimum viscosity can be determined by plotting the measured viscosity against temperature.

A fiber reinforced composite material produced from an epoxy resin composition that meets requirement 3 has a good appearance. It is inferred that this is because voids in the material are removed by the flow of the resin during the thermoforming step while excessive resin outflow is suppressed by gelation that occurs at an appropriate timing, thus serving to prevent a lack of resin (thin spots) occurring on the surface.

Requirement 4: The difference between the heat generation onset temperature (T0) and the heat generation offset temperature (T1) during the period in which the epoxy resin composition is heated from 30° C. to 300° C. by a differential scanning calorimeter (DSC) at a constant rate of 5° C./min is 25° C. or less.

Here, the difference between T0 and T1 represents the sharpness of the DSC exothermic reaction peak. The sharp rise of the exothermic reaction peak means that the curing onset temperature is higher compared to a slower rise when the exothermic reaction peak top temperature is the same. A higher curing onset temperature shows high stability over a wider temperature range. At the same time, since the DSC peak rises sharply, the curing reaction proceeds rapidly once it starts. That is, if the DSC peak rises sharply, the fast curability is not impaired even though the curing onset temperature of the epoxy resin composition is high.

Meeting requirement 4 indicates that the epoxy resin composition gives such a peak with a sharp rise, thereby serving to provide an epoxy resin composition having a better balance between fast curability and storage stability.

It is preferable that requirements 3 and 4 are met, because in that case, voids in the material are removed during the thermoforming step while excessive resin outflow is suppressed, thus serving to prevent thin spots from occurring on the surface, which permits the production of an epoxy resin that serves to provide a fiber reinforced composite material having a good appearance and that has high storage stability and exhibits fast curability even when curing is performed at a high temperature.

About Condition (iii)

Requirement 5: In Curelastometer measurement at 150° C., the demolding index calculated by dividing the maximum torque (TH) by the volume of the sample is 0.40 N·m/cm$^3$ or more and 1.50 N·m/cm$^3$ or less.

Requirement 6: In Curelastometer measurement at 150° C., the time tm(70) from the start of the measurement until torque reaches 70% of the maximum torque is 150 seconds or less.

Here, such Curelastometer measurements, which are adopted to set up requirements 5 and 6, can be taken by using, for example, a rotor-free type vulcanization/curing properties tester (Type V Curelastometer (registered trademark)). Specifically, an epoxy resin composition is prepared and a sample is placed in a die heated at 150° C., followed by applying a torsional stress and measuring the torque transmitted to the die which represents the viscosity increase caused by the progress of curing of the sample. From the measured torque-time curve, the largest torque value reached is determined as the maximum torque (TH) as shown in Fig. 1, and the maximum torque (TH) is divided by the volume of the specimen to calculate the demolding index.

If requirement 5 is met, it will be possible to produce an epoxy resin composition that serves to provide a cured epoxy resin free of deformation, warp, and cracks during the demolding step and accordingly, the resulting cured epoxy resin is smooth and highly demoldable. Therefore, a fiber reinforced composite material produced by applying heat and pressure to a laminate of prepregs prepared from an epoxy resin that meets requirement 5 will be highly demoldable from the die.

If requirement 6 is met, it will be possible to produce an epoxy resin composition that is high in fast curability.

Thus, if requirements 5 and 6 are met, it is preferable because in that case, deformation and warpage are prevented from occurring during the demolding step that follows the heat-molding step to permits the production of an epoxy resin composition that serves to provide a fiber reinforced composite material with a good surface appearance and that exhibits fast curability.

The epoxy resin composition according to embodiment 2 of the present invention contains components [A], [B], [C], and [D], and meets both the following requirement [d] and requirements 1 and 2.

[d]: 0.005≤(content of component [D]/content of component [C])≤0.045,

Requirement 1: In dielectric measurement at 80° C., the time period from the start of the measurement until the cure index reaches 10% is 120 minutes or more.

Requirement 2: In dielectric measurement at 150° C., the time period from the start of the measurement until the cure index reaches 70% is 120 seconds or less.

Components [A], [B], [C], and [D] are as described previously, and requirements 1 and 2 are the same as those applied to the epoxy resin composition according to embodiment 1 of the present invention. Requirement [d] will be described below.

Requirement [d] is a requirement for the ratio between the content of component [C] and the content of component [D], which is expressed by the following formula.

0.005≤(content of component [D]/content of component [C])≤0.045

When the ratio of the content of component [D] to the content of component [C] is smaller than 0.005, the storage stability may not be sufficiently high, whereas when it is larger than 0.045, the fast curability may not be sufficiently high. Here, the content of component [C] and the content of component [D] are as described previously.

The storage stability of a prepreg and the handleability in the preforming step are in a trade-off relationship with the curing speed, and therefore, it is commonly difficult for a combination of existing techniques enhance them simultaneously. A high storage stability of a prepreg, a high handleability in the preforming step, and a high curing speed can be achieved simultaneously if the epoxy resin composition according to embodiment 2 of the present invention contains components [A], [B], [C], and [D] and meets both requirement [d] and requirements 1 and 2 simultaneously.

It is preferable that the epoxy resin composition according to embodiment 2 of the present invention further meets the following requirements [e] and [f].

[e]: 0.9≤(number of moles of active groups in component [A]/number of moles of active hydrogen in component [B])≤1.3.

[f]: 12≤(content of component [A]/content of component [C])≤26 Requirements [e] and [f] will be described below in order.

Requirement [e] is a requirement for the ratio of the number of moles of active groups in component [A] to the number of moles of active hydrogen in the component [B], and it is expressed by the following formula.

0.9≤(number of moles of active groups in component [A]/number of moles of active hydrogen in component [B])≤1.3

If the ratio of the number of moles of active groups in component [A] to the number of moles of active hydrogen in component [B] exceeds 1.3, the fast curability may decrease to an insufficient level, whereas if it becomes smaller than 0.9, the resulting cured epoxy resin may fail to have sufficiently good mechanical properties. Therefore, if requirement [e] is met, it will be possible to provide an epoxy resin composition having a good balance between its fast curability and the mechanical properties of the cured epoxy resin to be obtained. Here, the number of moles of active groups in component [A] and the number of moles of active hydrogen in component [B] are as mentioned previously to describe requirement [b] for the epoxy resin composition according to embodiment 1 of the present invention.

Requirement [f] is a requirement for the ratio between the content of component [A] and the content of component [C], which is expressed by the following formula.

12≤(content of component [A]/content of component [C])≤26

If the ratio of the content of component [A] to the content of component [C] exceeds 26, the fast curability may decrease to an insufficient level, whereas if it becomes smaller than 12, the resulting cured epoxy resin may fail to have sufficiently good mechanical properties. Therefore, if requirement [f] is met, it will be possible to provide an epoxy resin composition having a good balance between its fast curability and the mechanical properties of the cured epoxy resin to be obtained. Here, the content of component [A] and the content of component [C] are as described previously.

The epoxy resin composition according to embodiment 3 of the present invention contains components [A], [B], [C], and [D], and meets both the following requirement [d] and requirements 3 and 4.

[d]: 0.005≤(content of component [D]/content of component [C])≤0.045, requirement 3: the temperature at which the epoxy resin composition exhibits the lowest viscosity when the temperature is raised from 40° C. to 250° C. at a rate of 5° C./minute in dynamic viscoelasticity measurement is 110° C. or more and 140° C. or less, and requirement 4: the difference between the heat generation onset temperature (T0) and the heat generation offset temperature (T1) during the period in which the epoxy resin composition is heated from 30° C. to 300° C. by a differential scanning calorimeter at a constant rate of 5° C./min is 25° C. or less.

Components [A], [B], [C], and [D] are as described previously, and requirements 3 and 4 are the same as those applied to the epoxy resin composition according to embodiment 1 of the present invention. Requirement [d] is the same as that applied to the epoxy resin composition according to embodiment 2 of the present invention.

Normally, it is difficult for a combination of separate techniques to achieve a high fast curability and a high storage stability of an epoxy resin composition and simultaneously achieve a good appearance of the fiber reinforced composite material produced from the resin. It is preferable that the epoxy resin composition according to embodiment 3 of the present invention contains components [A], [B], [C], and [D] and meets both requirement [d] and requirements 3 and 4 simultaneously because in that case, fiber alignment disorder and surface thin spots can be prevented from occurring in the thermoforming step, making it possible to produce an epoxy resin that serves to produce a fiber reinforced composite material having a good appearance and that has high storage stability and exhibits fast curability even when curing is performed at a high temperature.

It is preferable that the epoxy resin composition according to embodiment 4 of the present invention further meets requirements [d] and [f]. Requirements [d] and [f] are the same as those applied to the epoxy resin composition according to embodiment 2 of the present invention. The epoxy resin composition according to embodiment 4 of the present invention contains components [A], [B], [C], and [D], and meets both the following requirement [e] and requirements 5 and 6.

[e]: 0.9≤(number of moles of active groups in component [A]/number of moles of active hydrogen in component [B])≤1.3.

Requirement 5: In Curelastometer measurement at 150° C., the demolding index calculated by dividing the maximum torque (TH) by the volume of the sample is 0.40 N·m/cm$^3$ or more and 1.50 N·m/cm$^3$ or less.

Requirement 6: In Curelastometer measurement at 150° C., the time tm(70) from the start of the measurement until torque reaches 70% of the maximum torque is 150 seconds or less.

Components [A], [B], [C], and [D] are as described previously, and requirements 5 and 6 are the same as those applied to the epoxy resin composition according to embodiment 1 of the present invention. Furthermore, requirement [e] is the same as that applied to the epoxy resin composition according to embodiment 2 of the present invention.

Normally, it is difficult for a combination of separate techniques to simultaneously achieve a high fast curability and a high storage stability of an epoxy resin composition together with good demolding property of the cured epoxy resin produced by curing it. It is preferable that the epoxy resin composition according to embodiment 4 of the present invention contains components [A], [B], [C], and [D] and meets both requirement [e] and requirements 5 and 6 simultaneously because in that case, deformation and warpage are prevented from occurring during the demolding step that follows the heat-molding step to permit the production of an epoxy resin composition that serves to produce a fiber reinforced composite material with a good surface appearance and that exhibits high storage stability and fast curability. Thus, if any one of requirement [e] and requirements 5 and 6 is not met, it will be difficult to simultaneously achieve a high fast curability and a high storage stability and ensures the production of a fiber reinforced composite material with a good surface appearance from that resin.

It is preferable that the epoxy resin composition according to embodiment 4 of the present invention further satisfies requirements [d] and [f]. Requirements [d] and [f] are the same as those applied to the epoxy resin composition according to embodiment 2 of the present invention.

To an extent not adversely affecting the advantageous effects of the present invention, the epoxy resin composition according to the present invention may also contain a thermoplastic resin as component [E] in order to control the viscoelasticity for producing a prepreg with improved tackiness and drape properties and to provide a cured epoxy resin with improved mechanical properties and toughness. Examples of the thermoplastic resin include those thermoplastic resins that are soluble in epoxy resins as well as organic particles such as rubber particles and thermoplastic resin particles, inorganic particles such as silica particles, and others such as nanoparticles of CNT and graphene.

Examples of the thermoplastic resins that are soluble in epoxy resins include polyvinyl acetal resins such as polyvinyl formal and polyvinyl butyral, and others such as polyvinyl alcohol, phenoxy resin, polyamide, polyimide, polyvinyl pyrrolidone, and polysulfone.

Examples of the rubber particles include crosslinked rubber particles and core-shell rubber particles produced by graft-polymerizing a dissimilar polymer to the surface of crosslinked rubber particles.

To prepare an epoxy resin composition according to the present invention, kneading may be performed by using a machine such as kneader, planetary mixer, three roll mill, and twin screw extruder, or manual mixing by using a beaker, spatula, etc. may be adopted if uniform kneading is possible.

In producing a fiber reinforced composite material from an epoxy resin composition according to the present invention, it is preferable to first prepare a prepreg composed mainly of an epoxy resin composition and reinforcing fiber. In this form of material, i.e. prepreg, the fiber arrangement and resin proportions can be controlled accurately to allow the production of a composite material showing maximized advantage of properties. Such a prepreg can be obtained by impregnating a reinforcing fiber base with an epoxy resin composition according to the present invention. Good techniques for the impregnation include hot melting (dry method). Hot melting may be carried out by a process in which an epoxy resin composition having a viscosity reduced by heating is used for direct impregnation of the reinforcing fiber, or a process in which an epoxy resin composition is first spread over a piece of release paper or the like to form film sheets, which are then laid on one surface or on both surfaces of a reinforcing fiber sheet, followed by applying heat and pressure to impregnate the reinforcing fiber with the resin.

To perform laminate molding of prepreg layers, useful techniques include press molding, autoclave molding, bagging molding, wrapping tape molding, and internal pressure molding.

Next, the fiber reinforced composite material will be described below. The fiber reinforced composite material according to the present invention is produced by curing the prepreg according to the present invention. More specifically, by laminating layers of a prepreg prepared from the epoxy resin composition according to the present invention, followed by heating to cure the resin, it is possible to produce a fiber reinforced composite material containing, as matrix resin, a cured epoxy resin produced from the epoxy resin composition according to the present invention.

There are no specific limitations on the reinforcing fiber to be used for the present invention, and useful examples include glass fiber, carbon fiber, aramid fiber, boron fiber, alumina fiber, and silicon carbide fiber. A plurality of these fibers may be used as a mixture. The use of carbon fiber is preferable because it serves to produce lightweight, highly rigid fiber reinforced composite materials.

Fiber reinforced composite materials containing a cured epoxy resin produced from the epoxy resin composition according to the present invention together with reinforcing fiber are adopted favorably in sports applications, aerospace applications, and general industrial applications. More specifically, preferred sports applications include golf shafts, fishing rods, tennis and badminton rackets, hockey and other sticks, and skiing poles. Preferred applications in the aerospace industry include primary structural members of aircraft such as main wing, tail unit, and floor beam, and secondary structural members such as interior materials. Furthermore, preferred general industrial applications include structural material of automobiles, bicycles, ships, and railroad vehicles. In particular, prepregs composed mainly of the epoxy resin composition according to the present invention and carbon fiber are suitable for automobile members that require high-cycle molding because they are high in storage stability, resistant to long term storage in an unfrozen state, and also high in fast curability. In particular, they are used favorably for press molding, which is suitable for mass production. Furthermore, the prepregs produced from the epoxy resin composition according to the present invention are used favorably for a molding technique which applies heat and pressure to cure them, i.e., press molding. A fiber reinforced composite material can be produced in a still shorter period by placing a laminate containing sheets of such a prepreg in a heated die and then applying pressure. In addition, the features of fast curability and high fluidity serves to prevent the occurrence of fiber alignment disorder and thin spots, which often causes problems when performing press molding, thereby serving to provide molded articles having improved mechanical properties and decorative features.

EXAMPLES

The present invention is described below in more detail with reference to Examples, but it should be understood that the invention is not construed as being limited thereto.

<Materials Used>
The components used in the Examples are as described below.

1. Epoxy Resin [A]

[A1]-1: jER (registered trademark) 154 (phenol novolac type epoxy resin having 3.0 functional groups on average per molecule, manufactured by Mitsubishi Chemical Corporation)

[A1]-2: Epiclon (registered trademark) N-740 (phenol novolac type epoxy resin having 3.7 functional groups on average per molecule, manufactured by DIC Corporation)

[A1]-3: Epiclon (registered trademark) N-770 (phenol novolac type epoxy resin having 6.0 functional groups on average per molecule, manufactured by DIC Corporation)

[A1]-4: Epiclon (registered trademark) N-775 (phenol novolac type epoxy resin having 6.5 functional groups on average per molecule, manufactured by DIC Corporation)

[A1]-5: NC-7300 (naphthol novolac type epoxy resin having 3.4 functional groups on average per molecule, manufactured by Nippon Kayaku Co., Ltd.)

[A1]-6: EPON (registered trademark) 1050 (phenol novolac type epoxy resin having 3.6 functional groups on average per molecule, manufactured by Resolution Performance Products LLC)

[A1]-7: XD-1000 (dicyclopentadiene type epoxy resin having 1.5 functional groups on average per molecule, manufactured by Nippon Kayaku Co., Ltd.)

[A1]-8: Epiclon (registered trademark) HP7200H (dicyclopentadiene type epoxy resin having 3.0 functional groups on average per molecule, manufactured by DIC Corporation)

[A1]-9: Epotec (registered trademark) YDPN638 (phenol novolac type epoxy resin having 3.6 functional groups on average per molecule, manufactured by Tohto Kasei Co., Ltd.)

[A]-1: jER (registered trademark) 825 (bisphenol A type epoxy resin, manufactured by Mitsubishi Chemical Corporation)

[A]-2: YD-017KT55 (bisphenol A type epoxy resin, manufactured by Mitsubishi Chemical Corporation)

[A]-3: jER (registered trademark) 828 (bisphenol A type epoxy resin, manufactured by Mitsubishi Chemical Corporation)

[A]-4: jER (registered trademark) 1007FS (bisphenol A type epoxy resin, manufactured by Mitsubishi Chemical Corporation))

[A]-5: jER (registered trademark) 1001 (bisphenol A type epoxy resin, manufactured by Mitsubishi Chemical Corporation)

[A]-6: Epotec (registered trademark) YD136 (bisphenol A type epoxy resin, manufactured by KUKDO)

[A]-7: EPON (registered trademark) 2005 (bisphenol A type epoxy resin, manufactured by Resolution Performance Products LLC)

[A]-8: Epiclon (registered trademark) 830 (bisphenol F type epoxy resin, manufactured by DIC Corporation)

[A]-9 Epotohto (registered trademark) YDF-2001 (bisphenol F type epoxy resin, manufactured by Tohto Kasei Co., Ltd.)

[A]-10: jER (registered trademark) 4004P (bisphenol F type epoxy resin, manufactured by DIC Corporation)

[A]-11: jER (registered trademark) 4007P (bisphenol F type epoxy resin having an epoxy equivalent weight of 2250, manufactured by DIC Corporation)

[A]-12: jER (registered trademark) 4010P (bisphenol F type epoxy resin, manufactured by Mitsubishi Chemical Corporation)

[A]-13: Epiclon (registered trademark) EXA-1517 (bisphenol S type epoxy resin, manufactured by DIC Corporation)

[A]-14: SUMI-EPOXY (registered trademark) ELM434 (diaminodiphenylmethane type epoxy resin, manufactured by Sumitomo Chemical Co., Ltd.)

[A]-15: Epiclon (registered trademark) HP4700 (tetrafunctional naphthalene type epoxy resin, manufactured by DIC Corporation)

2. Dicyandiamide [B]

[B]-1: DICY7 (dicyandiamide, manufactured by Mitsubishi Chemical Corporation)

3. Aromatic Urea [C]

[C]-1: Omicure (registered trademark) 24 (4,4'-methylene bis(phenyldimethyl urea), manufactured by PTI Japan)

[C]-2: DCMU99 (3-(3,4-dichlorophenyl)-1,1-dimethylurea, manufactured by Hodogaya Chemical Co., Ltd.)

[C]-3: Dyhard (registered trademark) UR505 (4,4'-methylene bis(phenyldimethyl urea), manufactured by CVC)

4: Borate Ester [D]

[D]-1: Cureduct (registered trademark) L-07E (a composition containing 5 parts by mass of a borate ester compound, manufactured by Shikoku Chemicals Corporation)

[D]-2: Cureduct (registered trademark) L-07N (a composition containing 5 parts by mass of a borate ester compound, manufactured by Shikoku Chemicals Corporation) 5. Thermoplastic resin [E]

[E]-1: Vinylec (registered trademark) K (polyvinyl formal, manufactured by JNC Corporation)

[E]-2: Sumikaexcel (registered trademark) PES3600P (polyethersulfone, manufactured by Sumitomo Chemical Co., Ltd.)

[E]-3: YP-50 (phenoxy resin, manufactured by Nippon Steel & Sumikin Chemical Co., Ltd.)

<Method for Preparation of Epoxy Resin Composition>

Predetermined quantities of the components other than dicyandiamide [B], aromatic urea [C], and borate ester [D] were put in a stainless steel beaker, heated to 60° C. to 150° C., and kneaded as appropriate until all components reach a state of homogeneous mixture. After cooling to 60° C., borate ester component [D] was added and kneaded. Elsewhere, predetermined quantities of [A]-3 (jER (registered trademark) 828) and dicyandiamide [B] were taken in a polyethylene cup, and the mixture was passed twice between the rolls of a three roll mill to prepare a dicyandiamide master. The main component and the dicyandiamide master prepared above were mixed so that they would account for predetermined proportions and kneaded at 60° C. or less, followed by adding aromatic urea [C] and kneading at 60° C. for 30 minutes to prepare an epoxy resin composition.

<Evaluation Methods>

The evaluation methods used in the Examples are as described below. The evaluations were made based on one measurement (n=1) unless otherwise specified.

[Evaluation Method for Cure Index of Epoxy Resin Composition]

The cure time of an epoxy resin composition was measured using a cure monitor (MDE-10, manufactured by Homometrix-Micromet). An epoxy resin composition prepared by the above method was adopted as a sample and placed at rest on a press plate heated at 150° C. or 80° C., and the change in ion viscosity associated with the progress of curing in the sample was measured. The data obtained were converted into a cure index according to ASTM E2039-04, and the time period required to reach 70% or 10% was calculated.

<Evaluation Method for Minimum Ion Viscosity Observation Time of Epoxy Resin Composition>

The minimum ion viscosity of an epoxy resin composition was measured using a cure monitor (MDE-10, manufactured by Homometrix-Micromet). An epoxy resin composition prepared by the above method was adopted as a sample and placed at rest on a press plate heated at 80° C., and the time that elapsed before the start of increase in ion viscosity was measured.

<Evaluation Method for Minimum Viscosity Observation Temperature of Epoxy Resin Composition>

A 3 g portion of an epoxy resin composition prepared according to the <Method for preparation of epoxy resin composition> described above was weighed out and sandwiched between parallel plates with a diameter of 40 mm and a diameter of 50 mm, and a rotational type dynamic viscoelasticity measuring device (ARES W/FCO, manufactured by TA Instruments) was used to measure the viscosity of the epoxy resin composition at different temperatures while heating it from 40° C. to 250° C. under the conditions of a frequency of 3.14 rad/s and a temperature ramp rate of 5° C./min. In this instance, the temperature at which the epoxy resin composition showed the lowest viscosity was adopted as the minimum viscosity observation temperature.

<Evaluation Method for the Difference Between Heat Generation Onset Temperature (T0) and Heat Generation Offset Temperature (T1) of Epoxy Resin Composition>

A 3 mg sample of an epoxy resin composition prepared according to the <Method for preparation of epoxy resin composition> described above was weighed out, and measurements were taken using a differential scanning colorimeter (Q-2000, manufactured by TA Instrument) while increasing the temperature from 30° C. to 300° C. at a constant temperature ramp rate of 5° C./minute. The heat flow caused by the curing reaction was analyzed according to JIS K 0129 (2005). The intersections of the heat flow baseline with the tangent at the heat generation start point and that at the heat generation end point were adopted as the heat generation onset temperature (T0) and the heat generation offset temperature (T1), respectively, and the difference between the heat generation onset temperature and the heat generation offset temperature, i.e., T1−T0, was calculated.

<Evaluation Method for Cure Properties of Epoxy Resin Composition>

To examine the cure properties of an epoxy resin composition, a 2 mL portion of an epoxy resin composition prepared according to the <Method for preparation of epoxy resin composition> was weighed out and its curing behavior was observed using a Curelastometer (Type V JSR Curelastometer, manufactured by Nichigo Shoji Co., Ltd.) under the conditions of a measuring temperature of 150° C., an oscillatory wave form of sinusoidal wave, a vibration frequency of 100 cpm, and an amplitude angle of ±1°. The demolding index was calculated by dividing the maximum torque (TH) by the volume of the specimen, and the time that elapsed before reaching 70% of the maximum torque was adopted as the cure time.

<Evaluation Method for Demolding Property of Cured Epoxy Resin>

To evaluate the demolding property of a cured epoxy resin, an epoxy resin composition prepared according to the <Method for preparation of epoxy resin composition> described above was cast-molded to provide a cured epoxy resin, which was then demolded and observed visually. Specifically, the cast molding procedure included filling an O-ring of fluorine rubber (manufactured by ESCO) having an inside diameter of 3 cm and a thickness of 4 mm with the aforementioned epoxy resin composition and placed in a small type hot pressing machine (manufactured by AS ONE Corporation) preheated at 150° C., and then it was pressed under a pressure of 1.0 MPa for 10 minutes and subsequently demolded from the press die to provide an cured epoxy resin. The criteria used for demolding property evaluation based on visual observation were as described below.

The cured epoxy resin has a smooth surface and is free of deformation or warpage: rated as ⊙

The cured epoxy resin has a fairly smooth surface, but suffers from slight deformation or warpage: rated as ○

The cured epoxy resin suffers from significant deformation or warpage: rated as x <Evaluation Method for Storage Stability of Epoxy Resin Composition>

To evaluate the storage stability of an epoxy resin composition, a 3 g portion of the initial epoxy resin composition prepared according to the <Method for preparation of epoxy resin composition> described above was weighed out in an aluminum cup and stored in a thermo-hygrostat chamber at 40° C. and 75% RH for 14 days, and then the change in glass transition temperature, which is defined as $\Delta Tg = Ta - Tb$ wherein Ta is the glass transition temperature after the storage and Tb is the initial glass transition temperature, was calculated, followed by evaluating the storage stability based on the value of $\Delta Tg$. To determine the glass transition temperature, a 3 mg portion of the stored epoxy resin was weighed out on a sample pan and measurements were taken by using a differential scanning colorimeter (Q-2000, manufactured by TA Instrument) while increasing the temperature from −20° C. to 150° C. at a rate of 5° C./minute. The midpoint between the inflection points in the heat flow curve obtained was adopted as the glass transition temperature.

<Evaluation Method for Flexural Modulus of Cured Epoxy Resin>

An epoxy resin composition obtained according to the <Method for preparation of epoxy resin composition> described above was deaerated under a vacuum and cured at a temperature of 150° C. for 2 hours in a mold set at a thickness of 2 mm using a 2 mm thick spacer of TEFLON (registered trademark), thereby providing a cured epoxy resin plate with a thickness of 2 mm. A test piece having a width of 10 mm and a length of 60 mm was cut out from this cured epoxy resin plate, and 3-point bending test was conducted by using an Instron type universal tester (manufactured by Instron Corporation) under the conditions of a span of 32 mm and a crosshead speed of 10 mm/minute according to JIS K 7171 (1994) to determine the flexural modulus. Six samples (n=6) were examined and the average of the measurements taken was adopted to represent the flexural modulus.

<Method for Preparation of Prepreg>

An epoxy resin composition prepared according to the <Method for preparation of epoxy resin composition> described above was spread over a piece of release paper using a knife coater to produce two resin films having an areal weight of 39 $g/m^2$. Then carbon fibers of Torayca (registered trademark) T700S-12K-60E (manufactured by Toray Industries, Inc., having an areal weight of 150 $g/m^2$) were paralleled in one direction to form a sheet, and the two resin films prepared above were laminated both sides of the carbon fiber sheet and pressed under a pressure of 2 MPa while heating at a temperature of 90° C. to ensure impregnation with the epoxy resin composition to provide a unidirectional prepreg.

[Evaluation Method for External Appearance of Fiber Reinforced Composite Material]

A prepreg prepared according to the <Method for preparation of prepreg> described above was cut to produce sheets with a length of 200 mm and a width of 200 mm and five of them were stacked in such a manner that the fiber directions were perpendicular to each other, thereby providing a prepreg laminate. The laminate as prepared above were stacked with two 400 mm×400 mm stainless steel plates heated at 150° C. to cover their top and bottom sides, and heated for 5 minutes while applying a pressure of 3.5 MPa under a pressing machine to provide a fiber reinforced composite material.

The appearance of the resulting fiber reinforced composite material was observed visually and evaluated according to the following criteria.

Having smooth surfaces and free of meandering fibers and a lack of resin (thin spots): rated as A Having fairly smooth surfaces, but having pinholes, stains, meandering fibers, etc.: rated as B Having irregularities or thin spots on the surfaces and having noticeable meandering fibers, resin flows, etc.: rated as C <Method for Press Molding of Unidirectional Fiber Reinforced Composite Material>

A prepreg prepared according to the <Method for preparation of prepreg> described above was cut to produce 240 mm×240 mm sheets, and 16 of these sheets were laminated with fibers aligned in the same direction, thereby providing a 240 mm×240 mm prepreg laminate.

For the molding step, a double-sided mold was used. The lower mold has a concave shape with a size of 250 mm×250 mm containing a cavity with a depth of 25 mm. The upper mold has a convex shape with the convex portion fitting into the cavity of the lower mold. The mold is made of stainless steel (SS400). First, this double-sided mold was heated and controlled at 150° C., and a prepreg laminate prepared by the above method was placed at the center of the cavity in the lower mold, followed by closing the mold and pressing it for 5 minutes under a surface pressure of 3 MPa. After the 5 minute period, the prepreg laminate was demolded from the double-sided mold to provide a unidirectional fiber reinforced composite material.

<Evaluation Method for Bending Strength of Unidirectional Fiber Reinforced Composite Material>

A specimen with a width of 15 mm and a length of 100 mm was cut out of a laminate plate prepared according to the <Method for press molding of unidirectional fiber reinforced composite material> described above, and 3-point bending test was carried out according to JIS K 7017 (1988) using an Instron type universal tester (manufactured by Instron Corporation). Measurements were taken under the conditions of a crosshead speed of 5.0 mm/minute, a span of 80 mm, an indenter diameter of 10 mm, and a support column diameter of 4 mm to determine the bending strength. Such 0° bending strength measurements were taken from six specimens and converted on the assumption of a fiber mass content of 60 mass %, followed by calculating the average to represent their 0° bending strength.

Example 1

Using 80 parts by mass of jER (registered trademark) 828 and 20 parts by mass of jER (registered trademark) 154 as epoxy resin component [A], together with 11.3 parts by mass of DICY7 as dicyandiamide component [B], 4.5 parts by mass of Omicure (registered trademark) as aromatic urea component [C], and 3.0 parts by mass of Cureduct (registered trademark) L-07E as a mixture containing borate ester component [D], an epoxy resin composition was prepared according to the <Methods for preparation of epoxy resin composition> described above. As shown in Table 1, this epoxy resin composition had a ratio of 0.033 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 22 between the content of component [A] and the content of component [C], which was examined to determine whether it met requirement [c].

The time period required for its cure index to reach 10% at 80° C., which was examined to determine whether it met requirement 1, was 213 minutes, showing high stability; the time period required for its cure index to reach 70% at 150° C., which was examined to determine whether it met requirement 2, was 65 seconds, showing high fast curability; the temperature at which it showed the minimum viscosity, which was examined to determine whether it met requirement 3; was 122° C.;

the value of T1−T0, which was examined to determine whether it met requirement 4, was 17° C.; the demolding index, which was examined to determine whether it met requirement 5, was 0.41 N·m/cm$^3$; and the cure time (the time required for the peak torque to reach 70% in Curelastometer measurement), which was examined to determine whether it met requirement 6, was 118 seconds, showing high fast curability.

When evaluated according to the <Evaluation method for storage stability of epoxy resin composition>, this epoxy resin composition showed a ΔTg value of 14° C., and when evaluated according to the <Evaluation method for flexural modulus of cured epoxy resin>, it showed a flexural modulus of 3.5 GPa, both being favorable values.

When evaluated according to the <Evaluation method demolding property of cured epoxy resin>, it was rated as ○, and when a prepreg was prepared according to the procedure described in the <Method for preparation of prepreg> and evaluated according to <Evaluation method for external appearance of fiber reinforced composite material>, it had a surface appearance rated as A, both being favorable values.

Furthermore, when a fiber reinforced composite material was prepared according to the <Method for press molding of unidirectional fiber reinforced composite material> and evaluated according to the <Evaluation method for bending strength of unidirectional fiber reinforced composite material>, it showed a favorable 0° bending strength value of 1,588 MPa.

Examples 2 to 50

Except that the components in the epoxy resin compositions had contents as given in Tables 1 to 6, the same procedure as in Example 1 was carried out to prepare epoxy resin compositions and cured epoxy resins.

In Examples 2 to 17, 19, 25, 29 to 36, 38, 40 to 43, and 45 to 47, they had a ratio of 0.014 to 0.045 between the content of component [D] and the content of component [C], which was examined to determine whether they met requirement [a], a ratio of 0.9 to 1.2 between the number of moles of active groups in component [A] and the number of moles of active hydrogen in component [B], which was examined to determine whether it met requirement [b], and a ratio of 14 to 25 between the content of component [A] and the content of component [C], which was examined to determine whether it met requirement [c].

In Examples 18, 20 to 24, 26 to 28, 37, 39, 44, and 48 to 50, one or more of [a], [b], and [c] were met.

In Example 2 to 17, 19, 22, 24 to 26, and 29 to 47, all of requirements 1 to 6 were met to give good results. In addition, the epoxy resin compositions obtained were acceptable in terms of fast curability and storage stability; the cured epoxy resins obtained were acceptable in terms of flexural modulus and demolding property; and the fiber reinforced composite materials obtained were acceptable in terms of surface appearance and 0° bending strength.

In Example 18, 20, 21, and 23, all of requirements 1 to 6 were met to give good results. In addition, the epoxy resin compositions obtained were acceptable in terms of fast curability and storage stability; the cured epoxy resins obtained were acceptable in terms of demolding property; and the fiber reinforced composite materials obtained were acceptable in terms of surface appearance.

In Examples 27 and 28, requirements 1 to 5 were met to give good results, but requirements 6 was not met. In addition, the epoxy resin compositions obtained were acceptable in terms of storage stability; the cured epoxy resins obtained were acceptable in terms of demolding property; the cured resins obtained were acceptable in terms of flexural modulus; and the fiber reinforced composite materials obtained were acceptable in terms of surface appearance and 0° bending strength.

In Example 48 and 49, requirements 1 to 6 were met to give good results. The cured epoxy resins obtained were acceptable in terms of demolding property; the cured resins obtained were acceptable in terms of flexural modulus; and the fiber reinforced composite materials obtained were acceptable in terms of surface appearance and 0° bending strength.

In Example 50, requirements 1, and 3 to 6 were met to give good results, but requirement 2 was not met. The epoxy resin composition obtained was acceptable in terms of storage stability; the cured epoxy resin obtained was acceptable in terms of demolding property; the cured resin obtained was acceptable in terms of flexural modulus; and the fiber reinforced composite material obtained was acceptable in terms of surface appearance and 0° bending strength.

Comparative Example 1

Except that borate ester [D] was not added, the same procedure as in Example 1 was carried out to prepare an epoxy resin composition and a cured epoxy resin. The content of each component in the epoxy resin composition and its evaluation results are shown in Table 7. The epoxy resin composition had a ratio of 0 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 23 between the content of component [A] and the content of component [C], which was examined to determine whether it met requirement [c].

The epoxy resin composition obtained met requirements 2 and 6 to give good results, but failed to meet requirements 1, 3, 4, and 5 to show it was unacceptable.

The epoxy resin composition obtained was acceptable in terms of fast curability, but the epoxy resin composition was unacceptable in terms of storage stability and the cured epoxy resin was unacceptable in terms of flexural modulus and demolding property. In addition, the fiber reinforced composite material obtained was rated as C in terms of appearance because of noticeable thin spots. The fiber reinforced composite material had a 0° bending strength of 1,468 MPa and was unacceptable.

Comparative Example 2

Except that the quantity of DICY7 added as dicyandiamide [B] was decreased to 6.9 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.033 between the content of component [D] and the content of component [C], which was examined to determine whether it met requirement [a], a ratio of 1.7 between the number of moles of active groups in component [A] and the number of moles of active hydrogen in component [B], which was examined to determine whether it met requirement [b], and a ratio of 22 between the content of component [A] and the content of component [C], which was examined to determine whether it met requirement [c].

The epoxy resin composition obtained met requirements 1, 3, and 5 to give good results, but failed to meet requirements 2, 4, and 6 to show it was unacceptable.

The epoxy resin composition obtained was acceptable in terms of storage stability, and the cured epoxy resin was acceptable in terms of flexural modulus and demolding property, but the epoxy resin composition was unacceptable in terms of fast curability. In addition, the fiber reinforced composite material obtained was rated as C in terms of appearance because of noticeable meandering fibers and resin flows. The fiber reinforced composite material had a 0° bending strength of 1414 MPa and was unacceptable.

Comparative Example 3

Except that the quantity of Omicure (registered trademark) 24 added as aromatic urea [C] was decreased to 3 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.050 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 33 between the content of component [A] and the content of component [C], which was examined to determine whether it met requirement [c].

The epoxy resin composition obtained met requirements 1, 3, and 5 to give good results, but failed to meet requirements 2, 4, and 6 to show it was unacceptable.

The epoxy resin composition obtained was acceptable in terms of storage stability, and the cured epoxy resin was acceptable in terms of flexural modulus and demolding property, but the value of fast curability was unacceptably small. In addition, the fiber reinforced composite material obtained was rated as C in terms of appearance because of noticeable meandering fibers or resin flows. The fiber reinforced composite material had a 0° bending strength of 1,492 MPa and was unacceptable.

Comparative Example 4

Except that the quantity of DICY7 added as dicyandiamide [B] was decreased to 6.3 parts and that the quantity of Omicure (registered trademark) 24 added as aromatic urea [C] was decreased to 3 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.050 between the content of component [D] and the content of component [C], which was examined to determine whether it met requirement [a], a ratio of 1.8 between the number of moles of active groups in component [A] and the number of moles of active hydrogen in component [B], which was examined to determine whether it met requirement [b], and a ratio of 33 between the content of component [A] and the content of component [C], which was examined to determine whether it met requirement [c].

The epoxy resin composition obtained met requirements 1, 3, and 5 to give good results, but failed to meet requirements 2, 4, and 6 to show it was unacceptable.

The epoxy resin composition obtained was acceptable in terms of storage stability, and the cured epoxy resin was acceptable in terms of flexural modulus and demolding property, but the value of fast curability was unacceptably small. In addition, the fiber reinforced composite material obtained was rated as C in terms of appearance because of noticeable surface irregularities due to resin flows. The fiber reinforced composite material had a 0° bending strength of 1,422 MPa and was unacceptable.

Comparative Example 5

Except that the quantity of DICY7 added as dicyandiamide [B] was increased to 13.7 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.025 between the content of component [D] and the content of component [C], which was examined to determine whether it met requirement [a], a ratio of 0.8 between the number of moles of active groups in component [A] and the number of moles of active hydrogen in component [B], which was examined to determine whether it met requirement [b], and a ratio of 16 between the content of component [A] and the content of component [C], which was examined to determine whether it met requirement [c].

The epoxy resin composition obtained met requirements 1, and 3 to 6 to give good results, but failed to meet requirement 2 to show it was unacceptable.

Furthermore, the epoxy resin composition obtained was acceptable in terms of fast curability and storage stability, and the cured epoxy resin was acceptable in terms of demolding property, but the cured epoxy resin was unacceptable in terms of flexural modulus. In addition, the fiber reinforced composite material was unacceptable in terms of appearance and rated as C because an undissolved portion of the curing agent was deposited on the surface to cause whitening and uneven irregularities, leading to very poor surface quality. The fiber reinforced composite material had a 0° bending strength of 1,333 MPa and was unacceptable.

Comparative Example 6

Except that the quantity of Omicure (registered trademark) 24 added as aromatic urea [C] was increased to 11 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.014 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 9 between the content of component [A] and the content of component [C], which was examined to determine whether it met requirement [c].

The epoxy resin composition obtained met requirements 1, 4, 5, and 6 to give good results, but failed to meet requirements 2 and 3 to show it was unacceptable.

The epoxy resin composition obtained was acceptable in terms of fast curability and the cured epoxy resin was unacceptable in terms of demolding property, but the epoxy resin composition was unacceptable in terms of storage stability and the cured epoxy resin was unacceptable in terms of flexural modulus. In addition, the fiber reinforced composite material was unacceptable in terms of appearance and rated as C because an undissolved portion of the aromatic urea was deposited on the surface to cause whitening and uneven irregularities, leading to very poor surface quality. The fiber reinforced composite material had a 0° bending strength of 1,335 MPa and was unacceptable.

Comparative Example 7

Except that the quantity of Cureduct (registered trademark) L-07E added as borate ester [D] was increased to 7 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.048 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 14 between the content of component [A] and the content of component [C], which was examined to determine whether it met requirement [c].

The epoxy resin composition obtained met requirements 1, and 3 to 5 to give good results, but failed to meet requirements 2 and 6 to show it was unacceptable.

The epoxy resin composition obtained was acceptable in terms of storage stability, and the cured epoxy resin was acceptable in terms of demolding property and flexural modulus, but the epoxy resin composition was unacceptable in terms of fast curability. In addition, the fiber reinforced composite material obtained was rated as B in terms of appearance because of some stains attributable to thin spots. The fiber reinforced composite material had a 0° bending strength of 1,493 MPa and was unacceptable.

Comparative Example 8

Except that borate ester [D] was not added, the same procedure as in Example 1 was carried out to prepare an epoxy resin composition and a cured epoxy resin. The content of each component in the epoxy resin composition and its evaluation results are shown in Table 7. The epoxy resin composition had a ratio of 0 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 23 between the content of component [A] and the content of component [C], which was examined to determine whether it met requirement [c].

The epoxy resin composition obtained met requirements 2 and 6 to give good results, but failed to meet requirements 1, and 3 to 5 to show it was unacceptable.

The epoxy resin composition obtained was acceptable in terms of fast curability and the cured epoxy resin was acceptable in terms of flexural modulus, but the cured epoxy resin was unacceptable in terms of demolding property and the epoxy resin composition was unacceptable in terms of storage stability. In addition, the fiber reinforced composite material obtained was rated as C in terms of appearance because some irregularities attributable to thin spots were found over the entire surface. The fiber reinforced composite material had a 0° bending strength of 1,398 MPa and was unacceptable.

Comparative Example 9

Except that the quantity of DICY7 added as dicyandiamide [B] was decreased to 5 parts and that borate ester [D] was not added, the same procedure as in Example 1 was carried out to prepare an epoxy resin composition and a cured epoxy resin. The content of each component in the epoxy resin composition and its evaluation results are shown in Table 7. The epoxy resin composition had a ratio of 0 between the content of component [D] and the content of component [C], which was examined to determine whether it met requirement [a], a ratio of 1.8 between the number of moles of active groups in component [A] and the number of moles of active hydrogen in component [B], which was examined to determine whether it met requirement [b], and a ratio of 24 between the content of component [A] and the content of component [C], which was examined to determine whether it met requirement [c].

The epoxy resin composition obtained failed to meet requirements 1 to 6 to show it was unacceptable.

The epoxy resin composition obtained was unacceptable in terms of fast curability and storage stability and the cured epoxy resin was unacceptable in terms of flexural modulus and demolding property. In addition, the fiber reinforced composite material obtained was rated as C in terms of appearance because of noticeable resin flows and meandering fibers. The fiber reinforced composite material had a 0° bending strength of 1,356 MPa and was unacceptable.

Comparative Example 10

Except that the quantity of DICY7 added as dicyandiamide [B] was decreased to 5.3 parts and that the quantity of DCMU 99 added as aromatic urea [C] was 3 parts, the same procedure as in Example 1 was carried out to prepare an epoxy resin composition and a cured epoxy resin. The content of each component in the epoxy resin composition and its evaluation results are shown in Table 7. The epoxy resin composition had a ratio of 0.050 between the content of component [D] and the content of component [C], which was examined to determine whether it met requirement [a], a ratio of 1.8 between the number of moles of active groups in component [A] and the number of moles of active hydrogen in component [B], which was examined to determine whether it met requirement [b], and a ratio of 33 between the content of component [A] and the content of component [C], which was examined to determine whether it met requirement [c].

The epoxy resin composition obtained met requirements 1, 3, and 5 to give good results, but failed to meet requirements 2, 4, and 6 to show it was unacceptable.

The epoxy resin composition obtained was acceptable in terms of storage stability and the cured epoxy resin was acceptable in terms of flexural modulus and demolding property, but the epoxy resin composition was unacceptable in terms of fast curability. In addition, the fiber reinforced composite material obtained was rated as C in terms of appearance because of noticeable surface irregularities due to resin flows. The fiber reinforced composite material had a 0° bending strength of 1,455 MPa and was unacceptable.

Comparative Example 11

Except that the quantity of DICY7 added as dicyandiamide [B] was decreased to 7.0 parts, the same procedure as in Example 1 was carried out to prepare an epoxy resin composition and a cured epoxy resin. The content of each component in the epoxy resin composition and its evaluation results are shown in Table 8. The epoxy resin composition had a ratio of 0.033 between the content of component [D] and the content of component [C], which was examined to determine whether it met requirement [a], a ratio of 1.5 between the number of moles of active groups in component [A] and the number of moles of active hydrogen in component [B], which was examined to determine whether it met requirement [b], and a ratio of 22 between the content of component [A] and the content of component [C], which was examined to determine whether it met requirement [c].

The epoxy resin composition obtained met requirements 1, 3, and 5 to give good results, but failed to meet requirements 2, 4, and 6 to show it was unacceptable.

The epoxy resin composition obtained was acceptable in terms of storage stability and the cured epoxy resin was acceptable in terms of flexural modulus and demolding property, but the epoxy resin composition was unacceptable in terms of fast curability. In addition, the fiber reinforced composite material obtained was rated as C in terms of appearance because of noticeable meandering fibers and resin flows. The fiber reinforced composite material had a 0° bending strength of 1,348 MPa and was unacceptable.

Comparative Example 12

Except that the quantity of DICY7 added as dicyandiamide [B] was increased to 14.9 parts, the same procedure as in Example 1 was carried out to prepare an epoxy resin composition and a cured epoxy resin. The content of each component in the epoxy resin composition and its evaluation results are shown in Table 8. The epoxy resin composition had a ratio of 0.033 between the content of component [D] and the content of component [C], which was examined to determine whether it met requirement [a], a ratio of 0.7 between the number of moles of active groups in component [A] and the number of moles of active hydrogen in component [B], which was examined to determine whether it met requirement [b], and a ratio of 22 between the content of component [A] and the content of component [C], which was examined to determine whether it met requirement [c].

The epoxy resin composition obtained met requirements 1, 3, and 6 to give good results, but failed to meet requirements 2, 4, and 5 to show it was unacceptable.

The epoxy resin composition obtained was acceptable in terms of fast curability and storage stability and the cured epoxy resin was acceptable in terms of flexural modulus, but the cured epoxy resin was unacceptable in terms of demolding property. In addition, the fiber reinforced composite material was unacceptable in terms of appearance and rated as C because an undissolved portion of the curing agent was deposited on the surface to cause whitening and uneven irregularities, leading to very poor surface quality. The fiber reinforced composite material had a 0° bending strength of 1,255 MPa and was unacceptable.

Comparative Example 13

Except that aromatic urea [C] was not added and that 5 parts by mass of Cureduct (registered trademark) P-0505 was added, the same procedure as in Example 1 was carried out to prepare an epoxy resin composition and a cured epoxy resin. The content of each component in the epoxy resin composition and its evaluation results are shown in Table 8. For the epoxy resin composition, the ratio between the content of component [D] and the content of component [C], which was examined to determine whether it met requirement [a], was unable to be calculated; the ratio between the number of moles of active groups in component [A] and the number of moles of active hydrogen in component [B], which was examined to determine whether it met requirement [b], was 1.0; and the ratio between the content of component [A] and the content of component [C], which was examined to determine whether it met requirement [c], was unable to be calculated.

The epoxy resin composition obtained met requirement 5 to give good results, but failed to meet requirements 1 to 4, and 6 to show it was unacceptable.

The epoxy resin composition obtained was acceptable in terms of fast curability and the cured epoxy resin was acceptable in terms of demolding property and flexural modulus, but the epoxy resin composition was unacceptable in terms of storage stability. In addition, the fiber, reinforced composite material obtained was rated as C in terms of appearance because there were some meandering fibers and resin flows. The fiber reinforced composite material had a 0° bending strength of 1,353 MPa and was unacceptable.

Comparative Example 14

Except that the quantity of DICY7 added as dicyandiamide [B] was decreased to 4.7 parts, the same procedure as in Example 1 was carried out to prepare an epoxy resin composition, a cured epoxy resin, and fiber reinforced composite material. The epoxy resin composition had a ratio of 0.050 between the content of component [D] and the content of component [C], which was examined to determine whether it met requirement [a], a ratio of 1.8 between the number of moles of active groups in component [A] and the number of moles of active hydrogen in component [B], which was examined to determine whether it met requirement [b], and a ratio of 33 between the content of component [A] and the content of component [C], which was examined to determine whether it met requirement [c].

The epoxy resin composition obtained met requirements 1 and 3 to give good results, but failed to meet requirements 2, 4, 5, and 6 to show it was unacceptable.

The epoxy resin composition obtained was acceptable in terms of storage stability and the cured epoxy resin was acceptable in terms of flexural modulus, but the epoxy resin composition was unacceptable in terms of fast curability and the cured epoxy resin was unacceptable in terms of demolding property. In addition, the fiber reinforced composite material obtained was rated as C in terms of appearance because of noticeable meandering fibers and resin flows. The fiber reinforced composite material had a 0° bending strength of 1,379 MPa and was unacceptable.

Comparative Example 15

Except that borate ester [D] was not added, the same procedure as in Example 1 was carried out to prepare an epoxy resin composition and a cured epoxy resin. The content of each component in the epoxy resin composition and its evaluation results are shown in Table 8. The epoxy resin composition had a ratio of 0 between the content of component [D] and the content of component [C], which was examined to determine whether it met requirement [a], a ratio of 1.9 between the number of moles of active groups in component [A] and the number of moles of active hydrogen in component [B], which was examined to determine whether it met requirement [b], and a ratio of 24 between the content of component [A] and the content of component [C], which was examined to determine whether it met requirement [c].

The epoxy resin composition obtained failed to meet all of requirements 1 to 6 to show it was unacceptable.

The cured epoxy resin obtained was acceptable in terms of flexural modulus, but the epoxy resin composition was unacceptable in terms of fast curability and storage stability and the cured epoxy resin was unacceptable in terms of demolding property. In addition, the fiber reinforced composite material obtained was rated as C in terms of appearance because there are noticeable resin flows to cause thin spots on the surface. The fiber reinforced composite material had a 0° bending strength of 1,373 MPa and was unacceptable.

Comparative Example 16

Except that borate ester [D] was not added and that the quantity of DICY7 added as dicyandiamide [B] was decreased to 5.0 parts, the same procedure as in Example 1 was carried out to prepare an epoxy resin composition, a cured epoxy resin, and fiber reinforced composite material. The epoxy resin composition had a ratio of 0 between the content of component [D] and the content of component [C], which was examined to determine whether it met requirement [a], a ratio of 2.3 between the number of moles of active groups in component [A] and the number of moles of active hydrogen in component [B], which was examined to determine whether it met requirement [b], and a ratio of 33 between the content of component [A] and the content of component [C], which was examined to determine whether it met requirement [c].

The epoxy resin composition obtained met requirement 5 to give good results, but failed to meet requirements 1 to 4, and 6 to show it was unacceptable.

The cured epoxy resin was acceptable in terms of flexural modulus and demolding property, but the epoxy resin composition was unacceptable in terms of fast curability and storage stability. In addition, the fiber reinforced composite material obtained was rated as C in terms of appearance because of noticeable meandering fibers and resin flows. The fiber reinforced composite material had a 0° bending strength of 1,452 MPa and was unacceptable.

Comparative Example 17

Except that borate ester [D] was not added, the same procedure as in Example 1 was carried out to prepare an epoxy resin composition and a cured epoxy resin. The content of each component in the epoxy resin composition and its evaluation results are shown in Table 8. The epoxy resin composition had a ratio of 0 between the content of component [D] and the content of component [C], which was examined to determine whether it met requirement [a], a ratio of 1.0 between the number of moles of active groups in component [A] and the number of moles of active hydrogen in component [B], which was examined to determine whether it met requirement [b], and a ratio of 22 between the content of component [A] and the content of component [C], which was examined to determine whether it met requirement [c].

The epoxy resin composition obtained met requirements 5 and 6 to give good results, but failed to meet requirements 1 to 4 to show it was unacceptable.

The epoxy resin composition obtained was acceptable in terms of fast curability and the cured epoxy resin was acceptable in terms of flexural modulus and demolding property, but the epoxy resin composition was unacceptable in terms of storage stability. In addition, the fiber reinforced composite material obtained was rated as B in terms of appearance because of pinholes and stains found on the surface. The fiber reinforced composite material had a 0° bending strength of 1,400 MPa and was unacceptable.

Comparative Example 18

Except that dicyandiamide [B] was not added and that 20 parts by mass of Cureduct (registered trademark) P-0505 was added, the same procedure as in Example 1 was carried out to prepare an epoxy resin composition and a cured epoxy resin. The content of each component in the epoxy resin composition and its evaluation results are shown in Table 8. For the epoxy resin composition, the ratio between the content of component [D] and the content of component [C], which was examined to determine whether it met requirement [a], was unable to be calculated; the ratio between the number of moles of active groups in component [A] and the number of moles of active hydrogen in component [B], which was examined to determine whether it met requirement [b], was unable to be calculated; and the ratio between the content of component [A] and the content of component [C], which was examined to determine whether it met requirement [c], was unable to be calculated.

The epoxy resin composition obtained met requirements 1 and 5 to give good results, but failed to meet requirements 2, 3, 4, and 6 to show it was unacceptable.

The cured epoxy resin was acceptable in terms of flexural modulus and demolding property, but the epoxy resin composition was unacceptable in terms of fast curability and storage stability. In addition, the fiber reinforced composite material obtained was rated as C in terms of appearance because of noticeable meandering fibers and resin flows. The fiber reinforced composite material had a 0° bending strength of 1,347 MPa and was unacceptable.

The results given above are summarized in Tables 1 to 8, wherein "requirement [a]" means "determination of whether requirement [a] is met", and "requirement [b]", "requirement [c]", and "requirement 1" to "requirement 6" have similar meanings.

TABLE 1

| | Component | | Example 1 | Example 2 | Example 3 | Example 4 | Example 5 |
|---|---|---|---|---|---|---|---|
| [A]: epoxy resin | [A]-3: jER ® 828 | bisphenol A type epoxy resin | 80 | 60 | 40 | 20 | 45 |
| | [A]-4: jER ® 1007FS | bisphenol A type epoxy resin | | | | | |
| | [A]-8: Epicion ® 830 | bisphenol F type epoxy resin | | | | | |
| | [A]-9: Epotohto ® YDF-2001 | bisphenol F type epoxy resin | | | | | |
| | [A1]-1: jER ® 154 | phenol novolac type epoxy resin | 20 | 40 | 60 | 80 | 55 |
| | [A1]-2: Epicion ® N-740 | phenol novolac type epoxy resin | | | | | |
| | [A1]-3: Epicion ® N-770 | phenol novolac type epoxy resin | | | | | |
| [B]: dicyandiamide | [B]-1: DICY7 | dicyandiamide | 11.3 | 11.4 | 11.5 | 11.6 | 9.2 |
| [C]: aromatic urea | [C]-1: Omicure ® 24 | TBDMU | 4.5 | 4.5 | 4.6 | 4.6 | 4.6 |
| [D]: borate ester | [D]-1: Cureduct ® L-07E | borate ester | 3 | 3 | 3 | 3 | 3 |
| Requirement [a]: content of component [D]/content of component [C] | | | 0.033 | 0.033 | 0.033 | 0.033 | 0.033 |
| Requirement [b]: number of moles of active groups in component [A]/number of moles of active hydrogen in component [B] | | | 1.0 | 1.0 | 1.0 | 1.0 | 1.2 |
| Requirement [c]: content of component [A]/content of component [C] | | | 22 | 22 | 22 | 22 | 22 |
| Requirement 1: time for reaching a cure index of 10% in dielectric measurement at 80° C. | | minutes | 213 | 212 | 213 | 217 | 215 |
| Requirement 2: time for reaching a cure index of 70% in dielectric measurement at 150° C. | | seconds | 65 | 64 | 63 | 66 | 66 |

TABLE 1-continued

| | | | | | | | |
|---|---|---|---|---|---|---|---|
| Requirement 3: temperature of minimum viscosity | | ° C. | 122 | 122 | 123 | 123 | 123 |
| Requirement 4: T1−T0 | | ° C. | 17 | 17 | 17 | 17 | 17 |
| Requirement 5: demolding index | | [N · m/cm³] | 0.41 | 0.44 | 0.52 | 0.52 | 0.46 |
| Requirement 6: cure time (time for reaching 70% of peak torque in Curelastometer measurement | | seconds | 118 | 117 | 116 | 115 | 132 |
| Storage stability | ΔTg (40° C., 75% RH), 14th day | ° C. | 14 | 14 | 14 | 14 | 14 |
| Flexural modulus of cured resin | | GPa | 3.5 | 3.6 | 3.8 | 3.9 | 3.8 |
| Demolding property of cured resin | | | ○ | ◎ | ◎ | ◎ | ◎ |
| Properties of fiber reinforced composite material | surface appearance | | A | A | A | A | A |
| | 0° bending strength | MPa | 1,588 | 1,601 | 1,685 | 1,702 | 1,663 |

| | Component | | Example 6 | Example 7 | Example 8 | Example 9 |
|---|---|---|---|---|---|---|
| [A]: epoxy resin | [A]-3: jER® 828 | bisphenol A type epoxy resin | 35 | 25 | 45 | |
| | [A]-4: jER® 1007FS | bisphenol A type epoxy resin | | 20 | | |
| | [A]-8: Epicion® 830 | bisphenol F type epoxy resin | | | | 20 |
| | [A]-9: Epotohto® YDF-2001 | bisphenol F type epoxy resin | | | | 20 |
| | [A1]-1: jER® 154 | phenol novolac type epoxy resin | 65 | 55 | | |
| | [A1]-2: Epicion® N-740 | phenol novolac type epoxy resin | | | | 60 |
| | [A1]-3: Epicion® N-770 | phenol novolac type epoxy resin | | | 55 | |
| [B]: dicyandiamide | [B]-1: DICY7 | dicyandiamide | 11.6 | 9.5 | 11.2 | 10.4 |
| [C]: aromatic urea | [C]-1: Omicure® 24 | TBDMU | 4 | 5 | 6.7 | 5.4 |
| [D]: borate ester | [D]-1: Cureduct® L-07E | borate ester | 3 | 3 | 3 | 3 |
| Requirement [a]: content of component [D]/content of component [C] | | | 0.038 | 0.030 | 0.022 | 0.028 |
| Requirement [b]: number of moles of active groups in component [A]/number of moles of active hydrogen in component [B] | | | 1.0 | 1.0 | 1.0 | 1.0 |
| Requirement [c]: content of component [A]/content of component [C] | | | 25 | 20 | 15 | 19 |
| Requirement 1: time for reaching a cure index of 10% in dielectric measurement at 80° C. | | minutes | 217 | 220 | 197 | 207 |
| Requirement 2: time for reaching a cure index of 70% in dielectric measurement at 150° C. | | seconds | 63 | 59 | 67 | 67 |
| Requirement 3: temperature of minimum viscosity | | ° C. | 123 | 123 | 122 | 122 |
| Requirement 4: T1−T0 | | ° C. | 17 | 17 | 18 | 18 |
| Requirement 5: demolding index | | [N · m/cm³] | 0.50 | 0.48 | 0.48 | 0.43 |
| Requirement 6: cure time (time for reaching 70% of peak torque in Curelastometer measurement | | seconds | 125 | 135 | 129 | 131 |
| Storage stability | ΔTg (40° C., 75% RH), 14th day | ° C. | 12 | 15 | 14 | 15 |
| Flexural modulus of cured resin | | GPa | 3.8 | 3.8 | 3.8 | 3.8 |
| Demolding property of cured resin | | | ◎ | ◎ | ◎ | ○ |
| Properties of fiber reinforced composite material | surface appearance | | A | A | A | A |
| | 0° bending strength | MPa | 1,671 | 1,662 | 1,665 | 1,663 |

TABLE 2

| | | Component | Example 10 | Example 11 | Example 12 | Example 13 | Example 14 |
|---|---|---|---|---|---|---|---|
| [A]: epoxy resin | [A]-3: jER® 828 | bisphenol A type epoxy resin | 20 | | 30 | 30 | 30 |

TABLE 2-continued

| | Component | | | | | | | |
|---|---|---|---|---|---|---|---|---|
| | [A]-9: Epotohto® YDF-2001 | bisphenol F type epoxy resin | 20 | 25 | | | |
| | [A]-12: jER® 4010P | bisphenol F type epoxy resin | | | | | |
| | [A]-14: SUMI-EPOXY® ELM434 | diaminodiphenylmethane type epoxy resin | | 10 | | | |
| | [A1]-1: jER® 154 | phenol novolac type epoxy resin | | | 70 | 70 | 70 |
| | [A1]-8: Epicion® HP-7200H | dicyclopentadiene type epoxy resin | 60 | 65 | | | |
| [B]: dicyandiamide | [B]-1: DICY7 | dicyandiamide | 7.7 | 7.7 | 11.6 | 11.6 | 12.5 |
| [C]: aromatic urea | [C]-1: Omicure® 24 | TBDMU | 7.4 | 4 | 6.1 | 6.1 | 6.1 |
| [D]: borate ester | [D]-1: Cureduct® L-07E | borate ester | 3 | 3 | 3 | 3 | 3 |
| [E]: thermoplastic resin | [E]-1: Vinylec® K | PVF | | | 3 | | |
| | [E]-2: Sumika Excel® PES3600P | PES | | | | 3 | |
| Requirement [a]: content of component [D]/content of component [C] | | | 0.020 | 0.038 | 0.025 | 0.025 | 0.025 |
| Requirement [b]: number of moles of active groups in component [A]/number of moles of active hydrogen in component [B] | | | 1.0 | 1.0 | 1.0 | 1.0 | 0.9 |
| Requirement [c]: content of component [A]/content of component [C] | | | 14 | 25 | 16 | 16 | 16 |
| Requirement 1: time for reaching a cure index of 10% in dielectric measurement at 80° C. | | minutes | 192 | 220 | 200 | 203 | 194 |
| Requirement 2: time for reaching a cure index of 70% in dielectric measurement at 150° C. | | seconds | 77 | 79 | 71 | 73 | 67 |
| Requirement 3: temperature of minimum viscosity | | ° C. | 122 | 123 | 120 | 123 | 124 |
| Requirement 4: T1-T0 | | ° C. | 23 | 23 | 19 | 19 | 20 |
| Requirement 5: demolding index | | [N · m/cm³] | 0.55 | 0.59 | 0.52 | 0.54 | 0.51 |
| Requirement 6: cure time (time for reaching 70% of peak torque in Curelastometer measurement | | seconds | 137 | 142 | 114 | 110 | 115 |
| Storage stability | Δtg (40° C., 75% RH), 14th day | ° C. | 16 | 15 | 16 | 16 | 16 |
| Flexural modulus of cured resin | | GPa | 3.9 | 3.8 | 3.8 | 3.8 | 3.8 |
| Demolding property of cured resin | | | ◎ | ◎ | ◎ | ◎ | ◎ |
| Properties of fiber reinforced composite material | surface appearance | | A | A | A | A | A |
| | 0° bending strength | MPa | 1,698 | 1,660 | 1,685 | 1,690 | 1,685 |

| | | Component | Example 15 | Example 16 | Example 17 | Example 18 |
|---|---|---|---|---|---|---|
| [A]: epoxy resin | [A]-3: jER® 828 | bisphenol A type epoxy resin | 30 | 30 | 30 | 45 |
| | [A]-9: Epotohto® YDF-2001 | bisphenol F type epoxy resin | | | | |
| | [A]-12: jER® 4010P | bisphenol F type epoxy resin | | | | 10 |
| | [A]-14: SUMI-EPOXY® ELM434 | diaminodiphenylmethane type epoxy resin | | | | |
| | [A1]-1: jER® 154 | phenol novolac type epoxy resin | 70 | 70 | 70 | 45 |
| | [A1]-8: Epicion® HP-7200H | dicyclopentadiene type epoxy resin | | | | |
| [B]: dicyandiamide | [B]-1: DICY7 | dicyandiamide | 11.6 | 11.6 | 11.6 | 13 |
| [C]: aromatic urea | [C]-1: Omicure® 24 | TBDMU | 7.3 | 7.3 | 7.3 | 9.5 |
| [D]: borate ester | [D]-1: Cureduct® L-07E | borate ester | 3 | 1 | 6 | 3 |
| [E]: thermoplastic resin | [E]-1: Vinylec® K | PVF | | | | |
| | [E]-2: Sumika Excel® PES3600P | PES | | | | |
| Requirement [a]: content of component [D]/content of component [C] | | | 0.021 | 0.007 | 0.041 | 0.016 |
| Requirement [b]: number of moles of active groups in component [A]/number of moles of active hydrogen in component [B] | | | 1.0 | 1.0 | 1.0 | 0.8 |

TABLE 2-continued

|  |  |  |  |  |  |  |
|---|---|---|---|---|---|---|
| Requirement [c]: content of component [A]/ content of component [C] |  |  | 14 | 14 | 14 | 11 |
| Requirement 1: time for reaching a cure index of 10% in dielectric measurement at 80° C. |  | minutes | 192 | 135 | 243 | 127 |
| Requirement 2: time for reaching a cure index of 70% in dielectric measurement at 150° C. |  | seconds | 66 | 72 | 75 | 67 |
| Requirement 3: temperature of minimum viscosity |  | ° C. | 122 | 111 | 137 | 111 |
| Requirement 4: T1-T0 |  | ° C. | 21 | 24 | 14 | 20 |
| Requirement 5: demolding index |  | [N · m/cm$^3$] | 0.50 | 0.53 | 0.47 | 0.41 |
| Requirement 6: cure time (time for reaching 70% of peak torque in Curelastometer measurement |  | seconds | 112 | 120 | 143 | 110 |
| Storage stability | ΔTg (40° C., 75% RH), 14th day | ° C. | 16 | 18 | 12 | 17 |
| Flexural modulus of cured resin |  | GPa | 3.8 | 3.8 | 3.8 | 2.8 |
| Demolding property of cured resin |  |  | ◉ | ◉ | ◉ | ○ |
| Properties of fiber reinforced composite material | surface appearance |  | A | B | B | B |
|  | 0° bending strength | MPa | 1,689 | 1,675 | 1,667 | 1,423 |

TABLE 3

|  | Component |  | Example 19 | Example 20 | Example 21 | Example 22 | Example 23 |
|---|---|---|---|---|---|---|---|
| [A]: epoxy resin | [A]-3: jER® 828 | bisphenol A type epoxy resin | 30 | 30 | 30 | 30 | 30 |
|  | [A]-12: jER® 4010P | bisphenol F type epoxy resin | 10 | 10 | 10 | 10 | 10 |
|  | [A1]-1: jER® 154 | phenol novolactype epoxy resin | 60 | 60 | 60 | 60 | 60 |
| [B]: dicyandiamide | [B]-1: DICY7 | dicyandiamide | 10.5 | 13 | 13 | 8 | 10.5 |
| [C]: aromatic urea | [C]-1: Omicure® 24 | TBDMU | 5.5 | 3.5 | 9.5 | 9.5 | 13 |
| [D]: borate ester | [D]-1: Cureduct® L-07E | borate ester | 3 | 3 | 3 | 3 | 3 |
| Requirement [a]: content of Component [D]/content of component [C] |  |  | 0.027 | 0.043 | 0.016 | 0.016 | 0.012 |
| Requirement [b]: number of moles of active groups in component [A]/number of moles of active hydrogen in component [B] |  |  | 1.0 | 0.8 | 0.8 | 1.3 | 1.0 |
| Requirement [c]: content of component [A]/ content of component [C] |  |  | 18 | 29 | 11 | 11 | 8 |
| Requirement 1: time for reaching a cure index of 10% in dielectric measurement at 80° C. | minutes |  | 199 | 210 | 141 | 151 | 171 |
| Requirement 2: time for reaching a cure index of 70% in dielectric measurement at 150° C. | seconds |  | 67 | 91 | 65 | 95 | 76 |
| Requirement 3: temperature of minimum viscosity | ° C. |  | 121 | 120 | 113 | 118 | 115 |
| Requirement 4: T1-T0 | ° C. |  | 17 | 18 | 20 | 24 | 21 |
| Requirement 5: demolding index | [N · m/cm$^3$] |  | 0.49 | 0.50 | 0.48 | 0.47 | 0.47 |
| Requirement 6: cure time (time for reaching 70% of peak torque in Curelastometer measurement) | seconds |  | 135 | 125 | 110 | 130 | 114 |
| Storage stability | ΔTg (40° C., 75% RH), 14th day | ° C. | 15 | 14 | 17 | 17 | 19 |
| Flexural modulus of cured resin | GPa |  | 3.8 | 3.0 | 3.2 | 3.7 | 3.0 |
| Demolding property of cured resin |  |  | ◉ | ◉ | ◉ | ◉ | ◉ |
| Properties of fiber reinforced composite material | surface appearance |  | A | A | B | A | B |
|  | 0° bending strength | MPa | 1,667 | 1,333 | 1,423 | 1,641 | 1,352 |

TABLE 3-continued

| | Component | | Example 24 | Example 25 | Example 26 | Example 27 | Example 28 |
|---|---|---|---|---|---|---|---|
| [A]: epoxy resin | [A]-3: jER® 828 | bisphenol A type epoxy resin | 30 | 12 | 12 | 12 | 12 |
| | [A]-12: jER® 4010P | bisphenol F type epoxy resin | 10 | 53 | 53 | 53 | 53 |
| | [A1]-1: jER® 154 | phenol novolactype epoxy resin | 60 | 35 | 35 | 35 | 35 |
| [B]: dicyandiamide | [B]-1: DICY7 | dicyandiamide | 10.5 | 6 | 6 | 4.2 | 4.2 |
| [C]: aromatic urea | [C]-1: Omicure® 24 | TBDMU | 3.5 | 5.5 | 3.5 | 3.5 | 9.2 |
| [D]: borate ester | [D]-1: Cureduct® L-07E | borate ester | 3 | 3 | 3 | 1 | 8 |
| Requirement [a]: content of Component [D]/content of component [C] | | | 0.043 | 0.027 | 0.043 | 0.014 | 0.043 |
| Requirement [b]: number of moles of active groups in component [A]/number of moles of active hydrogen in component [B] | | | 1.0 | 1.0 | 1.0 | 1.4 | 1.4 |
| Requirement [c]: content of component [A]/content of component [C] | | | 29 | 18 | 29 | 29 | 11 |
| Requirement 1: time for reaching a cure index of 10% in dielectric measurement at 80° C. | | minutes | 233 | 221 | 241 | 240 | 124 |
| Requirement 2: time for reaching a cure index of 70% in dielectric measurement at 150° C. | | seconds | 100 | 72 | 90 | 118 | 119 |
| Requirement 3: temperature of minimum viscosity | | °C. | 124 | 123 | 123 | 112 | 123 |
| Requirement 4: T1-T0 | | °C. | 16 | 19 | 19 | 24 | 25 |
| Requirement 5: demolding index | | [N · m/cm³] | 0.51 | 0.41 | 0.41 | 0.40 | 0.42 |
| Requirement 6: cure time (time for reaching 70% of peak torque in Curelastometer measurement) | | seconds | 147 | 112 | 125 | 251 | 247 |
| Storage stability | ΔTg (40° C., 75% RH), 14th day | °C. | 14 | 15 | 15 | 19 | 15 |
| Flexural modulus of cured resin | | GPa | 3.6 | 3.8 | 3.8 | 3.8 | 3.8 |
| Demolding property of cured resin | | | ◎ | ◎ | ◎ | ◎ | ◎ |
| Properties of fiber reinforced composite material | surface appearance | | A | A | A | A | A |
| | 0° bending strength | MPa | 1,600 | 1,690 | 1,673 | 1,666 | 1,670 |

TABLE 4

| | Component | | Example 29 | Example 30 | Example 31 | Example 32 |
|---|---|---|---|---|---|---|
| [A]: epoxy resin | [A]-3: jER® 828 | bisphenol A type epoxy resin | 70 | 50 | 40 | 40 |
| | [A]-13: Epicion® EXA-1517 | bisphenol S type epoxy resin | 30 | | | |
| | [A1]-1: jER® 154 | phenol novolac type epoxy resin | | 50 | | |
| | [A1]-2: Epicion® N-740 | phenol novolac type epoxy resin | | | | |
| | [A1]-3: Epicion® N-770 | phenol novolac type epoxy resin | | | | |
| | [A1]-4: Epicion® N-775 | phenol novolac type epoxy resin | | | | |
| | [A1]-5: NC-7300 | naphthol novolac-type epoxy resin | | | 60 | |
| | [A1]-7: XD-1000 | dicyclopentadiene type epoxy resin | | | | 60 |
| [B]: dicyandiamide | [B]-1: DICY7 | dicyandiamide | 10.4 | 11.5 | 10.0 | 9.5 |
| [C]: aromatic urea | [C]-1: Omicure® 24 | TBDMU | 4.5 | 4.5 | 4.6 | 4.6 |
| [D]: borate ester | [D]-1: Cureduct® L-07E | borate ester | 3 | 3 | 3 | 3 |
| Requirement [a]: content of Component [D]/content of component [C] | | | 0.033 | 0.033 | 0.033 | 0.033 |
| Requirement [b]: number of moles of active groups in component [A]/number of moles of active hydrogen in component [B] | | | 1.0 | 1.0 | 1.0 | 1.0 |

TABLE 4-continued

| | | | | | | |
|---|---|---|---|---|---|---|
| Requirement [c]: content of component [A]/content of component [C] | | | 22 | 22 | 22 | 22 |
| Requirement 1: time for reaching a cure index of 10% in dielectric measurement at 80° C. | | minutes | 221 | 225 | 223 | 230 |
| Requirement 2: time for reaching a cure index of 70% in dielectric measurement at 150° C. | | seconds | 73 | 71 | 70 | 74 |
| Requirement 3: temperature of minimum viscosity | | ° C. | 125 | 126 | 123 | 122 |
| Requirement 4: T1-T0 | | ° C. | 18 | 15 | 15 | 17 |
| Requirement 5: demolding index | | [N · m/cm$^3$] | 0.41 | 0.43 | 0.66 | 0.50 |
| Requirement 6: cure time (time for reaching 70% of peak torque in Curelastometer measurement) | | seconds | 131 | 113 | 105 | 125 |
| Storage stability | ΔTg (40° C., 75% RH), 14th day | ° C. | 18 | 13 | 15 | 14 |
| Flexural modulus of cured resin | | GPa | 3.6 | 3.6 | 3.9 | 3.7 |
| Demolding property of cured resin | | | ○ | ○ | ◎ | ◎ |
| Properties of fiber reinforced composite material | surface appearance | | B | B | A | B |
| | 0° bending strength | MPa | 1,598 | 1,603 | 1,711 | 1,635 |

| | Component | | | Example 33 | Example 34 | Example 35 |
|---|---|---|---|---|---|---|
| [A]: epoxy resin | [A]-3: jER® 828 | bisphenol A type epoxy resin | | 30 | 45 | 30 |
| | [A]-13: Epicion® EXA-1517 | bisphenol S type epoxy resin | | | | |
| | [A1]-1: jER® 154 | phenol novolac type epoxy resin | | | | |
| | [A1]-2: Epicion® N-740 | phenol novolac type epoxy resin | | | | 70 |
| | [A1]-3: Epicion® N-770 | phenol novolac type epoxy resin | | | 55 | |
| | [A1]-4: Epicion® N-775 | phenol novolac type epoxy resin | | 70 | | |
| | [A1]-5: NC-7300 | naphthol novolac-type epoxy resin | | | | |
| | [A1]-7: XD-1000 | dicyclopentadiene type epoxy resin | | | | |
| [B]: dicyandiamide | [B]-1: DICY7 | dicyandiamide | | 11.1 | 12.3 | 11.5 |
| [C]: aromatic urea | [C]-1: Omicure® 24 | TBDMU | | 4 | 5 | 6.7 |
| [D]: borate ester | [D]-1: Cureduct® L-07E | borate ester | | 3 | 3 | 3 |
| Requirement [a]: content of component [D]/content of component [C] | | | | 0.038 | 0.030 | 0.022 |
| Requirement [b]: number of moles of active groups in component [A]/number of moles of active hydrogen in component [B] | | | | 1.0 | 1.0 | 1.0 |
| Requirement [c]: content of component [A]/content of component [C] | | | | 25 | 20 | 15 |
| Requirement 1: time for reaching a cure index of 10% in dielectric measurement at 80° C. | | minutes | | 210 | 232 | 240 |
| Requirement 2: time for reaching a cure index of 70% in dielectric measurement at 150° C. | | seconds | | 74 | 75 | 69 |
| Requirement 3: temperature of minimum viscosity | | ° C. | | 121 | 125 | 123 |
| Requirement 4: T1-T0 | | ° C. | | 17 | 16 | 17 |
| Requirement 5: demolding index | | [N · m/cm$^3$] | | 0.55 | 0.62 | 0.65 |
| Requirement 6: cure time (time for reaching 70% of peak torque in Curelastometer measurement) | | seconds | | 123 | 120 | 125 |
| Storage stability | ΔTg (40° C., 75% RH), 14th day | ° C. | | 18 | 13 | 12 |
| Flexural modulus of cured resin | | GPa | | 3.8 | 3.8 | 3.8 |
| Demolding property of cured resin | | | | ◎ | ◎ | ◎ |
| Properties | surface appearance | | | B | A | A |

TABLE 4-continued

| | | | | | | |
|---|---|---|---|---|---|---|
| of fiber reinforced composite material | 0° bending strength | MPa | | 1,682 | 1,684 | 1,680 |

TABLE 5

| | Component | | Example 36 | Example 37 | Example 38 | Example 39 |
|---|---|---|---|---|---|---|
| [A]: epoxy resin | [A]-1: jER® 825 | bisphenol A type epoxy resin | | 30 | | |
| | [A]-2: YD-017KT55 | bisphenol A type epoxy resin | | | | |
| | [A]-3: jER® 828 | bisphenol A type epoxy resin | 30 | | 30 | 30 |
| | [A1]-1: jER® 154 | phenol novolac type epoxy resin | 70 | | | |
| | [A1]-2: Epicion® N-740 | phenol novolac type epoxy resin | | | 70 | |
| | [A1]-5: NC-7300 | naphthol novolac-type epoxy resin | | 70 | | |
| | [A1]-7: XD-1000 | dicyclopentadiene | | | | 70 |
| [B]: dicyandiamide | [B]-1: DICY7 | dicyandiamide | 11.6 | 12.7 | 13.8 | 11.2 |
| [C]: aromatic urea | [C]-1: Omicure® 24 | TBDMU | 4.5 | 4.5 | 4.5 | 3.7 |
| [D]: borate ester | [D]-1: Cureduct® L-07E | borate ester | 3 | 3 | 3 | 3 |
| [E]: thermoplastic resin | [E]-1: Vinylec® K | PVF | | | | |
| Requirement [a]: content of component [D]/content of component [C] | | | 0.033 | 0.033 | 0.033 | 0.041 |
| Requirement [b]: number of moles of active groups in component [A]/number of moles of active hydrogen in component [B] | | | 1.0 | 1.3 | 1.2 | 1.2 |
| Requirement [c]: content of component [A]/content of component [C] | | | 22 | 22 | 22 | 27 |
| Requirement 1: time for reaching a cure index of 10% in dielectric measurement at 80° C. | | minutes | 213 | 220 | 245 | 209 |
| Requirement 2: time for reaching a cure index of 70% in dielectric measurement at 150° C. | | seconds | 78 | 75 | 65 | 76 |
| Requirement 3: temperature of minimum viscosity | | ° C. | 120 | 121 | 123 | 122 |
| Requirement 4: T1-T0 | | ° C. | 18 | 15 | 17 | 22 |
| Requirement 5: demolding index | | [N · m/cm³] | 0.57 | 0.69 | 0.55 | 0.50 |
| Requirement 6: cure time (time for reaching 70% of peak torque in Curelastometer measurement) | | seconds | 123 | 95 | 105 | 135 |
| Storage stability | ΔTg (40° C., 75% RH), 14th day | ° C. | 11 | 16 | 12 | 10 |
| Flexural modulus of cured resin | | GPa | 3.9 | 3.9 | 3.9 | 3.9 |
| Demolding property of cured resin | | | ⊚ | ⊚ | ⊚ | ⊚ |
| Properties of fiber reinforced composite material | surface appearance | | B | A | A | A |
| | 0° bending strength | MPa | 1,705 | 1,735 | 1,712 | 1,701 |

| | Component | | Example 40 | Example 41 | Example 42 | Example 43 |
|---|---|---|---|---|---|---|
| [A]: epoxy resin | [A]-1: jER® 825 | bisphenol A type epoxy resin | 15 | | 40 | |
| | [A]-2: YD-017KT55 | bisphenol A type epoxy resin | | | | 15 |
| | [A]-3: jER® 828 | bisphenol A type epoxy resin | | 15 | | 15 |
| | [A1]-1: jER® 154 | phenol novolac type epoxy resin | | | | |
| | [A1]-2: Epicion® N-740 | phenol novolac type epoxy resin | | 85 | | 70 |
| | [A1]-5: NC-7300 | naphthol novolac-type epoxy resin | 85 | | 60 | |
| | [A1]-7: XD-1000 | dicyclopentadiene | | | | |

TABLE 5-continued

| | | | | | | |
|---|---|---|---|---|---|---|
| [B]: dicyandiamide | [B]-1: DICY7 | dicyandiamide | 9.1 | 11.5 | 10.5 | 10.0 |
| [C]: aromatic urea | [C]-1: Omicure ® 24 | TBDMU | 4.5 | 4.5 | 6.0 | 6.0 |
| [D]: borate ester | [D]-1: Cureduct ® L-07E | borate ester | 3 | 3 | 3 | 3 |
| [E]: thermoplastic resin | [E]-1: Vinylec ® K | PVF | | | 3 | 3 |
| Requirement [a]: content of component [D]/content of component [C] | | | 0.033 | 0.033 | 0.025 | 0.025 |
| Requirement [b]: number of moles of active groups in component [A]/number of moles of active hydrogen in component [B] | | | 0.9 | 1.0 | 1.0 | 1.0 |
| Requirement [cl]: content of component [A]/content of component [C] | | | 22 | 22 | 17 | 17 |
| Requirement 1: time for reaching a cure index of 10% in dielectric measurement at 80° C. | | minutes | 227 | 232 | 241 | 235 |
| Requirement 2: time for reaching a cure index of 70% in dielectric measurement at 150° C. | | seconds | 74 | 76 | 69 | 72 |
| Requirement 3: temperature of minimum viscosity | | ° C. | 121 | 118 | 121 | 122 |
| Requirement 4: T1-T0 | | ° C. | 17 | 19 | 16 | 18 |
| Requirement 5: demolding index | | [N · m/cm$^3$] | 1.11 | 0.98 | 0.67 | 0.55 |
| Requirement 6: cure time (time for reaching 70% of peak torque in Curelastometer measurement) | | seconds | 103 | 121 | 88 | 115 |
| Storage stability | ΔTg (40° C., 75% RH), 14th day | ° C. | 17 | 12 | 18 | 17 |
| Flexural modulus of cured resin | | GPa | 3.9 | 3.8 | 3.7 | 3.8 |
| Demolding property of cured resin | | | ☺ | ☺ | ☺ | ☺ |
| Properties of fiber reinforced composite material | surface appearance | | A | B | A | A |
| | 0° bending strength | MPa | 1,715 | 1,682 | 1,655 | 1,685 |

TABLE 6

| | Component | | Example 44 | Example 45 | Example 46 | Example 47 |
|---|---|---|---|---|---|---|
| [A]: epoxy resin | [A]-1: jER ® 825 | bisphenol A type epoxy resin | 15 | | 15 | |
| | [A]-3: jER ® 828 | bisphenol A type epoxy resin | | 15 | | 15 |
| | [A]-10: jER ® 4004P | bisphenol F type epoxy resin | | 10 | | |
| | [A]-11: jER ® 4007P | bisphenol F type epoxy resin | | | 5 | 10 |
| | [A1]-1: jER ® 154 | phenol novolac type epoxy resin | | | | |
| | [A1]-3: Epicion ® N-770 | phenol novolac type epoxy resin | | | 80 | |
| | [A1]-5: NC-7300 | naphthol novolac-type epoxy resin | 85 | 75 | | |
| | [A1]-7: XD-1000 | dicyclopentadiene type epoxy resin | | | | 75 |
| | [A1]-8: Epicion ® HP-7200H | dicyclopentadiene type epoxy resin | | | | |
| [B]: dicyandiamide | [B]-1: DICY7 | dicyandiamide | 9.9 | 10.9 | 13.0 | 9.6 |
| [C]: aromatic urea | [C]-4: Omicure ® 94 | PDMU | | | | |
| | [C]-1: Omicure ® 24 | TBDMU | 7.3 | 4.5 | 6.0 | 6.0 |
| [D]: borate ester | [D]-1: Cureduct ® L-07E | borate ester | 1 | 3 | 3 | 3 |
| [E]: thermoplastic resin | [E]-1: Vinylec ® K | PVF | | | 3.0 | |
| | [E]-2: Sumika Excel ® PES3600P | PES | | 1.5 | | 3.0 |
| Requirement [a]: content of component [D]/content of component [C] | | | 0.007 | 0.033 | 0.025 | 0.025 |
| Requirement [b]: number of moles of active | | | 1.2 | 0.9 | 1.0 | 1.0 |

TABLE 6-continued

| | | | | | |
|---|---|---|---|---|---|
| groups in component [A]/number of moles of active hydrogen in component [B] | | | | | |
| Requirement [c]: content of component [A]/content of component [C] | | 14 | 22 | 17 | 17 |
| Requirement 1: time for reaching a cure index of 10% in dielectric measurement at 80° C. | minutes | 155 | 231 | 232 | 234 |
| Requirement 2: time for reaching a cure index of 70% in dielectric measurement at 150° C. | seconds | 71 | 65 | 70 | 71 |
| Requirement 3: temperature of minimum viscosity | ° C. | 110 | 123 | 120 | 121 |
| Requirement 4: T1-T0 | ° C. | 17 | 17 | 17 | 17 |
| Requirement 5: demolding index | [N · m/cm³] | 0.81 | 0.73 | 0.67 | 1.03 |
| Requirement 6: cure time (time for reaching 70% of peak torque in Curelastometer measurement) | seconds | 118 | 93 | 103 | 110 |
| Storage stability | ΔTg (40° C., 75% RH), 14th day | ° C. | 19 | 16 | 17 | 16 |
| Flexural modulus of cured resin | | GPa | 3.9 | 3.9 | 3.8 | 3.8 |
| Demolding property of cured resin | | | ◎ | ◎ | ◎ | ◎ |
| Properties of fiber reinforced composite material | surface appearance | | A | A | A | A |
| | 0° bending strength | MPa | 1,707 | 1,735 | 1,693 | 1,691 |

| | Component | | Example 48 | Example 49 | Example 50 |
|---|---|---|---|---|---|
| [A]: epoxy resin | [A]-1: jER® 825 | bisphenol A type epoxy resin | 40 | | 15 |
| | [A]-3: jER® 828 | bisphenol A type epoxy resin | | 40 | |
| | [A]-10: jER® 4004P | bisphenol F type epoxy resin | | | |
| | [A]-11: jER® 4007P | bisphenol F type epoxy resin | | | |
| | [A1]-1: jER® 154 | phenol novolac type epoxy resin | | 60 | |
| | [A1]-3: Epicion® N-770 | phenol novolac type epoxy resin | | | |
| | [A1]-5: NC-7300 | naphthol novolac-type epoxy resin | 60 | | 85 |
| | [A1]-7: XD-1000 | dicyclopentadiene type epoxy resin | | | |
| | [A1]-8: Epicion® HP-7200H | dicyclopentadiene type epoxy resin | | | |
| [B]: dicyandiamide | [B]-1: DICY7 | dicyandiamide | 10.5 | 11.6 | 9.9 |
| [C]: aromatic urea | [C]-4: Omicure® 94 | PDMU | | 3.0 | |
| | [C]-1: Omicure® 24 | TBDMU | 9.0 | 6.0 | 4.5 |
| [D]: borate ester | [D]-1: Cureduct® L-07E | borate ester | 3 | 3 | 6 |
| [E]: thermoplastic resin | [E]-1: Vinylec® K | PVF | | | |
| | [E]-2: Sumika Excel® PES3600P | PES | | | |
| Requirement [a]: content of component [D]/content of component [C] | | | 0.017 | 0.017 | 0.067 |
| Requirement [b]: number of moles of active groups in component [A]/number of moles of active hydrogen in component [B] | | | 1.0 | 1.3 | 1.2 |
| Requirement [c]: content of component [A]/content of component [C] | | | 11 | 11 | 22 |
| Requirement 1: time for reaching a cure index of 10% in dielectric measurement at 80° C. | minutes | | 207 | 212 | 255 |
| Requirement 2: time for reaching a cure index of 70% in dielectric measurement at 150° C. | seconds | | 66 | 71 | 148 |
| Requirement 3: temperature of minimum viscosity | ° C. | | 121 | 122 | 124 |
| Requirement 4: T1-T0 | ° C. | | 17 | 17 | 20 |
| Requirement 5: demolding index | [N · m/cm³] | | 0.60 | 0.53 | 0.81 |

TABLE 6-continued

|  |  |  |  |  |  |
|---|---|---|---|---|---|
| Requirement 6: cure time (time for reaching 70% of peak torque in Curelastometer measurement) | | seconds | 80 | 101 | 145 |
| Storage stability | ΔTg (40° C., 75% RH), 14th day | ° C. | 28 | 26 | 10 |
| Flexural modulus of cured resin | | GPa | 3.8 | 3.8 | 3.9 |
| Demolding property of cured resin | | | ⊚ | ⊚ | ⊚ |
| Properties of fiber reinforced composite material | surface appearance | | A | A | B |
| | 0° bending strength | MPa | 1,697 | 1,694 | 1,696 |

TABLE 7

| | Component | | Comparative example 1 | Comparative example 2 | Comparative example 3 | Comparative example 4 | Comparative example 5 |
|---|---|---|---|---|---|---|---|
| [A]: epoxy resin | [A]-3: jER® 828 | bisphenol A type epoxy resin | 100 | 45 | 35 | 30 | 30 |
| | [A]-5: jER® 1001 | bisphenol A type epoxy resin | | | | | |
| | [A]-6: Epotec® YD136 | bisphenol A type epoxy resin | | | | | |
| | [A]-7: Epon® 2005 | bisphenol A type epoxy resin | | | | | |
| | [A1]-1: jER® 154 | phenol novolac type epoxy resin | | 55 | 65 | 70 | 70 |
| | [A1]-9: Epotec® YDPN638 | phenol novolac type epoxy resin | | | | | |
| [B]: dicyandiamide | [B]-1: DICY7 | dicyandiamide | 11.2 | 6.9 | 11.5 | 6.3 | 13.7 |
| [C]: aromatic urea | [C]-1: Omicure® 24 | TBDMU | 4.4 | 4.6 | 3 | 3 | 6.1 |
| | [C]-2: DCMU99 | DCMU | | | | | |
| | [C]-3: Dyhard® UR505 | TBDMU | | | | | |
| [D]: borate ester | [D]-1: Cureduct® L-07E | borate ester | 0 | 3 | 3 | 3 | 3 |
| [E]: thermoplastic resin | [E]-1: Vinylec® K | PVF | | | | | |
| | [E]-3: YP-50 | phenoxy resin | | | | | |
| Requirement [a]: content of component [D]/content of component [C] | | | 0 | 0.033 | 0.050 | 0.050 | 0.025 |
| Requirement [b]: number of moles of active groups in component [A]/number of moles of active hydrogen in component [B] | | | 1.0 | 1.7 | 1.0 | 1.8 | 0.8 |
| Requirement [c]: content of component [A]/content of component [C] | | | 23 | 22 | 33 | 33 | 16 |
| Requirement 1: time for reaching a cure index of 10% in dielectric measurement at 80° C. | | minutes | 50 | 235 | 233 | 240 | 221 |
| Requirement 2: time for reaching a cure index of 70% in dielectric measurement at 150° C. | | seconds | 71 | 247 | 192 | 250 | 132 |
| Requirement 3: temperature of minimum viscosity | | ° C. | 100 | 135 | 123 | 123 | 121 |
| Requirement 4: T1-T0 | | ° C. | 30 | 35 | 30 | 36 | 24 |
| Requirement 5: demolding index | | [N · m/cm³] | 0.32 | 0.43 | 0.48 | 0.52 | 0.51 |
| Requirement 6: cure time (time for reaching 70% of peak torque in Curelastometer measurement) | | seconds | 118 | 315 | 272 | 351 | 115 |
| Storage stability | ΔTg (40° C., 75% RH), 14th day | ° C. | 40 | 15 | 15 | 15 | 15 |
| Flexural modulus of cured resin | | GPa | 3.3 | 3.8 | 3.8 | 3.8 | 3.0 |
| Demolding property of cured resin | | | x | ○ | ○ | ○ | ○ |
| Properties of fiber reinforced composite material | surface appearance | | C | C | C | C | C |
| | 0° bending strength | MPa | 1,468 | 1,414 | 1,492 | 1,422 | 1,333 |

TABLE 7-continued

| | Component | | Comparative example 6 | Comparative example 7 | Comparative example 8 | Comparative example 9 | Comparative example 10 |
|---|---|---|---|---|---|---|---|
| [A]: epoxy resin | [A]-3: jER® 828 | bisphenol A type epoxy resin | 30 | 30 | 8.3 | 76.4 | 40 |
| | [A]-5: jER® 1001 | bisphenol A type epoxy resin | | | | | 30 |
| | [A]-6: Epotec® YD136 | bisphenol A type epoxy resin | | | 55.1 | | |
| | [A]-7: Epon® 2005 | bisphenol A type epoxy resin | | | | 23.6 | |
| | [A1]-1: jER® 154 | phenol novolac type epoxy resin | 70 | 70 | | | 30 |
| | [A1]-9: Epotec® YDPN638 | phenol novolac type epoxy resin | | | 33.1 | | |
| [B]: dicyandiamide | [B]-1: DICY7 | dicyandiamide | 11.5 | 11.5 | 8.3 | 5 | 5.3 |
| [C]: aromatic urea | [C]-1: Omicure® 24 | TBDMU | 11 | 7.3 | | 4.2 | |
| | [C]-2: DCMU99 | DCMU | | | | | 3 |
| | [C]-3: Dyhard® UR505 | TBDMU | | | 4.2 | | |
| [D]: borate ester | [D]-1: Cureduct® L-07E | borate ester | 3 | 7 | 0 | 0 | 3 |
| [E]: thermoplastic resin | [E]-1: Vinylec® K | PVF | | | | 3.4 | 3 |
| | [E]-3: YP-50 | phenoxy resin | | | 3.6 | | |
| Requirement [a]: content of component [D]/content of component [C] | | | 0.014 | 0.048 | 0 | 0 | 0.050 |
| Requirement [b]: number of moles of active groups in component [A]/number of moles of active hydrogen in component [B] | | | 1.0 | 1.0 | 1.0 | 1.8 | 1.8 |
| Requirement [c]: content of component [A]/content of component [C] | | | 9 | 14 | 23 | 24 | 33 |
| Requirement 1: time for reaching a cure index of 10% in dielectric measurement at 80° C. | | minutes | 221 | 249 | 45 | 59 | 241 |
| Requirement 2: time for reaching a cure index of 70% in dielectric measurement at 150° C. | | seconds | 152 | 125 | 68 | 261 | 199 |
| Requirement 3: temperature of minimum viscosity | | ° C. | 145 | 138 | 97 | 96 | 131 |
| Requirement 4: T1-T0 | | ° C. | 10 | 22 | 37 | 41 | 34 |
| Requirement 5: demolding index | | [N · m/cm³] | 0.52 | 0.49 | 0.24 | 0.22 | 0.40 |
| Requirement 6: cure time (time for reaching 70% of peak torque in Curelastometer measurement) | | seconds | 112 | 202 | 120 | 367 | 287 |
| Storage stability | ΔTg (40° C., 75% RH), 14th day | ° C. | 30 | 9 | 49 | 29 | 9 |
| Flexural modulus of cured resin | | GPa | 3.0 | 3.8 | 3.6 | 3.4 | 3.5 |
| Demolding property of cured resin | | | ○ | ○ | x | x | ○ |
| Properties of fiber reinforced composite material | surface appearance | | C | B | C | C | C |
| | 0° bending strength | MPa | 1,335 | 1,493 | 1,398 | 1,356 | 1,455 |

TABLE 8

| | Component | | Comparative example 11 | Comparative example 12 | Comparative example 13 | Comparative example 14 |
|---|---|---|---|---|---|---|
| [A]: epoxy resin | [A]-3: jER® 828 | bisphenol A type epoxy resin | 70 | 70 | 70 | |
| | [A]-7: Epon® 2005 | bisphenol A type epoxy resin | | | | |
| | [A]-8: Epicion® 830 | bisphenol F type epoxy resin | | | | 30 |
| | [A]-9: Epotohto® YDF-2001 | bisphenol F type epoxy resin | | | | 25 |
| | [A]-13: Epicion® EXA-1517 | bisphenol S type epoxy resin | 30 | 30 | 30 | |
| | [A1]-1: jER® 154 | phenol novolac type epoxy resin | | | | |

TABLE 8-continued

|  |  |  |  |  |  |  |
|---|---|---|---|---|---|---|
|  | [A1]-6: Epon ® 1050 | phenol novolac type epoxy resin |  |  |  |  |
|  | [A1]-8: Epicion ® HP-7200H | dicyclopentadiene type epoxy resin |  |  |  | 45 |
| [B]: dicyandiamide | [B]-1: DICY7 | dicyandiamide | 7.0 | 14.9 | 10.4 | 4.7 |
| [C]: aromatic urea | [C]-2: DCMU99 | DCMU |  |  |  | 3 |
|  | [C]-1: Omicure ® 24 | TBDMU | 4.5 | 4.5 |  |  |
| [D]: borate ester | [D]-1: Cureduct ® L-07E | borate ester | 3 | 3 | 3 |  |
|  | [D]-2: Cureduct ® L-07N | borate ester |  |  |  | 3 |
| [E]: thermoplastic resin | [E]-1: Vinylec ® K | PVF |  |  |  | 1.5 |
| Curing agent, catalyst other than components element [B] and [C] | Cureduct ® P-0505 | Imidazole adduct |  |  | 5 |  |
| Requirement [a]: content of component [D]/content of component [C] |  |  | 0.033 | 0.033 | — | 0.050 |
| Requirement [b]: number of moles of active groups in component [A]/number of moles of active hydrogen in component [B] |  |  | 1.5 | 0.7 | 1.0 | 1.8 |
| Requirement [c]: content of component [A]/content of component [C] |  |  | 22 | 22 | — | 33 |
| Requirement 1: time for reaching a cure index of 10% in dielectric measurement at 80° C. | minutes |  | 265 | 210 | 107 | 217 |
| Requirement 2: time for reaching a cure index of 70% in dielectric measurement at 150° C. | seconds |  | 190 | 132 | 152 | 197 |
| Requirement 3: temperature of minimum viscosity | ° C. |  | 139 | 135 | 105 | 139 |
| Requirement 4: T1-T0 | ° C. |  | 36 | 31 | 37 | 26 |
| Requirement 5: demolding index | [N · m/cm³] |  | 0.41 | 0.35 | 0.40 | 0.28 |
| Requirement 6: cure time (time for reaching 70% of peak torque in Curelastometer measurement) | seconds |  | 243 | 117 | 162 | 297 |
| Storage stability | ΔTg (40° C., 75% RH), 14th day | ° C. | 19 | 20 | 38 | 9 |
| Flexural modulus of cured resin |  | GPa | 3.5 | 3.5 | 3.5 | 3.6 |
| Demolding property of cured resin |  |  | ○ | x | ○ | x |
| Properties of fiber reinforced composite material | surface appearance |  | C | C | C | C |
|  | 0° bending strength | MPa | 1,348 | 1,255 | 1,353 | 1,379 |

|  | Component |  | Comparative example 15 | Comparative example 16 | Comparative example 17 | Comparative example 18 |
|---|---|---|---|---|---|---|
| [A]: epoxy resin | [A]-3: jER ® 828 | bisphenol A type epoxy resin | 37.5 | 15 | 70 | 70 |
|  | [A]-7: Epon ® 2005 | bisphenol A type epoxy resin | 23.6 |  |  |  |
|  | [A]-8: Epicion ® 830 | bisphenol F type epoxy resin |  |  |  |  |
|  | [A]-9: Epotohto ® YDF-2001 | bisphenol F type epoxy resin |  |  |  |  |
|  | [A]-13: Epicion ® EXA-1517 | bisphenol S type epoxy resin |  |  | 30 | 30 |
|  | [A1]-1: jER ® 154 | phenol novolac type epoxy resin |  | 85 |  |  |
|  | [A1]-6: Epon ® 1050 | phenol novolac type epoxy resin | 38.9 |  |  |  |
|  | [A1]-8: Epicion ® HP-7200H | dicyclopentadiene type epoxy resin |  |  |  |  |
| [B]: dicyandiamide | [B]-1: DICY7 | dicyandiamide | 5.0 | 5.0 | 10.4 |  |
| [C]: aromatic urea | [C]-2: DCMU99 | DCMU |  |  |  |  |
|  | [C]-1: Omicure ® 24 | TBDMU | 4.2 | 3.0 | 4.5 |  |

TABLE 8-continued

| | | | | | | |
|---|---|---|---|---|---|---|
| [D]: borate ester | [D]-1: Cureduct ® L-07E | borate ester | | | | 10 |
| | [D]-2: Cureduct ® L-07N | borate ester | | | | |
| [E]: thermoplastic resin | [E]-1: Vinylec ® K | PVF | 3.4 | | | |
| Curing agent, catalyst other than components element [B] and [C] | Cureduct ® P-0505 | Imidazole adduct | | | | 20 |
| Requirement [a]: content of component [D]/content of component [C] | | | 0 | 0 | 0 | — |
| Requirement [b]: number of moles of active groups in component [A]/number of moles of active hydrogen in component [B] | | | 1.9 | 2.3 | 1.0 | — |
| Requirement [c]: content of component [A]/content of component [C] | | | 24 | 33 | 22 | — |
| Requirement 1: time for reaching a cure index of 10% in dielectric measurement at 80° C. | | minutes | 47 | 55 | 60 | 125 |
| Requirement 2: time for reaching a cure index of 70% in dielectric measurement at 150° C. | | seconds | 257 | 167 | 134 | 256 |
| Requirement 3: temperature of minimum viscosity | | ° C. | 102 | 97 | 96 | 105 |
| Requirement 4: T1-T0 | | ° C. | 37 | 38 | 39 | 27 |
| Requirement 5: demolding index | | [N · m/cm³] | 0.18 | 0.85 | 0.42 | 0.47 |
| Requirement 6: cure time (time for reaching 70% of peak torque in Curelastometer measurement) | | seconds | 367 | 197 | 119 | 329 |
| Storage stability | ΔTg (40° C., 75% RH), 14th day | ° C. | 29 | 32 | 42 | 25 |
| Flexural modulus of cured resin | | GPa | 3.6 | 3.9 | 3.5 | 3.5 |
| Demolding property of cured resin | | | x | ○ | ○ | ○ |
| Properties of fiber reinforced composite material | surface appearance | | C | C | B | C |
| | 0° bending strength | MPa | 1,373 | 1,452 | 1,400 | 1,347 |

Here, in Tables, the quantity of each component is shown in parts by mass.

INDUSTRIAL APPLICABILITY

The use of the epoxy resin composition according to the present invention makes it possible to provide a prepreg that is high in both fast curability and storage stability. In addition, it can form a cured material having good mechanical properties, and accordingly can serve favorably as matrix resin of a fiber reinforced composite material. In particular, it can be used favorably for industrial applications that require high-cycle molding.

The invention claimed is:

1. An epoxy resin composition comprising the following components [A], [B], [C], and [D] and meeting the following requirements [a], [b], and [c]:
    [A]: epoxy resin,
    [B]: dicyandiamide,
    [C]: aromatic urea,
    [D]: borate ester,
    [a]: 0.014≤(content of component [D]/content of component [C])≤0.045,
    [b]: 0.9≤(number of moles of active groups in component [A]/number of moles of active hydrogen in component [B])≤1.2, and
    [c] 14≤(content of component [A]/content of component [C])≤25.

2. The epoxy resin composition as set forth in claim 1 that meets the following requirement 1 and requirement 2:
    requirement 1: in dielectric measurement at 80° C., the time period from the start of the measurement until the cure index reaches 10% is 120 minutes or more, and
    requirement 2: in dielectric measurement at 150° C., the time period from the start of the measurement until the cure index reaches 70% is 120 seconds or less.

3. The epoxy resin composition as set forth in claim 1 that meets the following requirement 3 and requirement 4:
    requirement 3: the temperature at which the epoxy resin composition exhibits the lowest viscosity when the temperature is raised from 40° C. to 250° C. at a rate of 5° C./minute in dynamic viscoelasticity measurement is 110° C. or more and 140° C. or less, and
    requirement 4: the difference between the heat generation onset temperature (T0) and the heat generation offset temperature (T1) during the period in which the epoxy resin composition is heated from 30° C. to 300° C. in a differential scanning calorimeter at a constant rate of 5° C./min is 25° C. or less.

4. The epoxy resin composition as set forth in claim 1 that meets the following requirement 5 and requirement 6:
    requirement 5: in Curelastometer measurement at 150° C., the demolding index calculated by dividing the maximum torque (TH) by the volume of the sample is 0.40 N·m/cm³ or more and 1.50 N·m/cm³ or less, and
    requirement 6: in Curelastometer measurement at 150° C., the time tm(70) from the start of the measurement until torque reaches 70% of the maximum torque is 150 seconds or less.

5. The epoxy resin composition as set forth in claim 1, wherein the change in glass transition temperature that occurs during storage at 40° C. and 75% RH for 14 days is 20° C. or less.

6. The epoxy resin composition as set forth in claim 1, wherein component [A] contains a tri- or higher functional epoxy resin.

7. The epoxy resin composition as set forth in claim 6, wherein the following component [A1], used as the tri- or higher functional epoxy resin, accounts for 55 to 100 parts by mass in 100 parts by mass of component [A]:
[A1]: an epoxy resin as represented by formula (I) or an epoxy resin as represented by formula (II):

[Chemical compound 1]

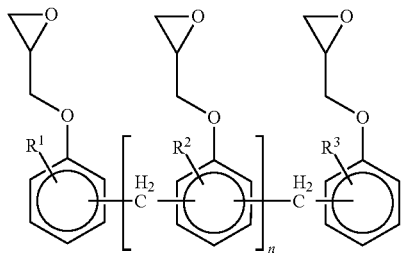

(I)

wherein in formula (I), $R^1$, $R^2$, and $R^3$ are each independently a hydrogen atom or a methyl group, and n is an integer of 1 or more, and

[Chemical compound 2]

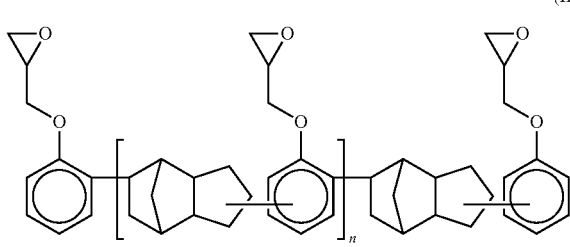

(II)

wherein in formula (II), n is an integer of 1 or more.

8. A prepreg comprising the epoxy resin composition as set forth in claim 1 and reinforcing fiber.

9. A fiber reinforced composite material produced by curing the prepreg as set forth in claim 8.

10. An epoxy resin composition comprising components [A], [B], [C], and [D], meeting the following requirements [d], [e], and [f], and also meeting the following requirement 1 and requirement 2:
[A]: epoxy resin, wherein component [A] contains a tri- or higher functional epoxy resin,
[B]: dicyandiamide,
[C]: aromatic urea,
[D]: borate ester,
[d]: 0.005≤(content of component [D]/content of component [C])≤0.045,
[e]: 0.9≤(number of moles of active groups in component [A]/number of moles of active hydrogen in component [B])≤1.3,
[f] 12≤(content of component [A]/content of component [C])≤26, requirement 1: in dielectric measurement at 80° C., the time period from the start of the measurement until the cure index reaches 10% is 120 minutes or more, and
requirement 2: in dielectric measurement at 150° C., the time period from the start of the measurement until the cure index reaches 70% is 120 seconds or less,
wherein the following component [A1], used as the tri- or higher functional epoxy resin, accounts for 55 to 100 parts by mass in 100 parts by mass of component [A]:
[A1]: an epoxy resin as represented by formula (I) or an epoxy resin as represented by formula (II):

[Chemical compound 1]

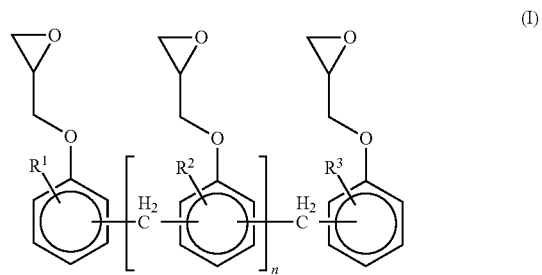

(I)

wherein in formula (I), $R^1$, $R^2$, and $R^3$ are each independently a hydrogen atom or a methyl group, and n is an integer of 1 or more, and

[Chemical compound 2]

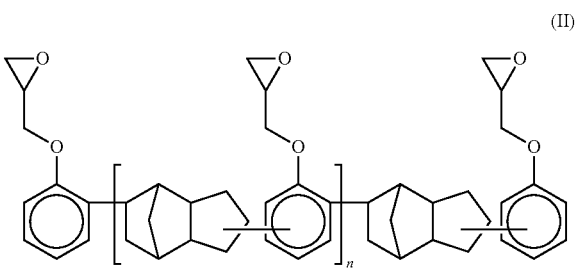

(II)

wherein in formula (II), n is an integer of 1 or more.

11. The epoxy resin composition as set forth in claim 10, wherein the change in glass transition temperature that occurs during storage at 40° C. and 75% RH for 14 days is 20° C. or less.

12. A prepreg comprising the epoxy resin composition as set forth in claim 10 and reinforcing fiber.

13. A fiber reinforced composite material produced by curing the prepreg as set forth in claim 12.

14. An epoxy resin composition comprising components [A], [B], [C], and [D], meeting the requirements [d], [e], and [f], and also meeting the following requirement 3 and requirement 4:
[A]: epoxy resin, wherein component [A] contains a tri- or higher functional epoxy resin,
[B]: dicyandiamide,
[C]: aromatic urea,
[D]: borate ester,
[d]: 0.005≤(content of component [D]/content of component [C])≤0.045,
[e]: 0.9≤(number of moles of active groups in component [A]/number of moles of active hydrogen in component [B])≤1.3,

[f] 12≤(content of component [A]/content of component [C])≤26, requirement 3: The temperature at which the epoxy resin composition exhibits the lowest viscosity when the temperature is raised from 40° C. to 250° C. at a rate of 5° C./minute in dynamic viscoelasticity measurement is 110° C. or more and 140° C. or less, and requirement 4: the difference between the heat generation onset temperature (T0) and the heat generation offset temperature (T1) during the period in which the epoxy resin composition is heated from 30° C. to 300° C. in a differential scanning calorimeter at a constant rate of 5° C./min is 25° C. or less, wherein the following component [A1], used as the tri- or higher functional epoxy resin, accounts for 55 to 100 parts by mass in 100 parts by mass of component [A]:

[A1]: an epoxy resin as represented by formula (I) or an epoxy resin as represented by formula (II):

[Chemical compound 1]

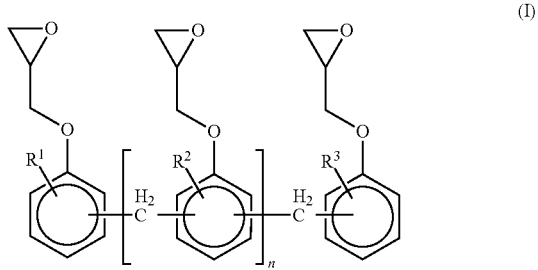

(I)

wherein in formula (I), $R^1$, $R^2$, and $R^3$ are each independently a hydrogen atom or a methyl group, and n is an integer of 1 or more, and

[Chemical compound 2]

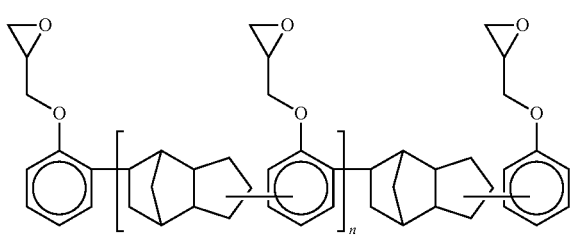

(II)

wherein in formula (II), n is an integer of 1 or more.

15. The epoxy resin composition as set forth in claim 14, wherein the change in glass transition temperature that occurs during storage at 40° C. and 75% RH for 14 days is 20° C. or less.

16. A prepreg comprising the epoxy resin composition as set forth in claim 14 and reinforcing fiber.

17. A fiber reinforced composite material produced by curing the prepreg as set forth in claim 16.

18. An epoxy resin composition comprising components [A], [B], [C], and [D], meeting the following requirements [d], [e], and [f], and also meeting the following requirement 5 and requirement 6:

[A]: epoxy resin, wherein component [A] contains a tri- or higher functional epoxy resin,

[B]: dicyandiamide,

[C]: aromatic urea,

[D]: borate ester,

[d]: 0.005≤(content of component [D]/content of component [C])≤0.045,

[e]: 0.9≤(number of moles of active groups in component [A]/number of moles of active hydrogen in component [B])≤1.3,

[f] 12≤(content of component [A]/content of component [C])≤26, requirement 5: in Curelastometer measurement at 150° C., the demolding index calculated by dividing the maximum torque (TH) by the volume of the sample is 0.40 N·m/cm³ or more and 1.50 N·m/cm³ or less, and requirement 6: in Curelastometer measurement at 150° C., the time tm(70) from the start of the measurement until torque reaches 70% of the maximum torque is 150 seconds or less, wherein the following component [A1], used as the tri- or higher functional epoxy resin, accounts for 55 to 100 parts by mass in 100 parts by mass of component [A]:

[A1]: an epoxy resin as represented by formula (I) or an epoxy resin as represented by formula (II):

[Chemical compound 1]

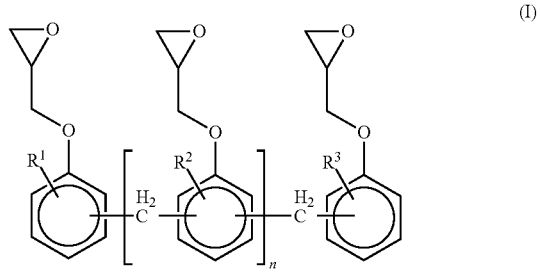

(I)

wherein in formula (I), $R^1$, $R^2$, and $R^3$ are each independently a hydrogen atom or a methyl group, and n is an integer of 1 or more, and

[Chemical compound 2]

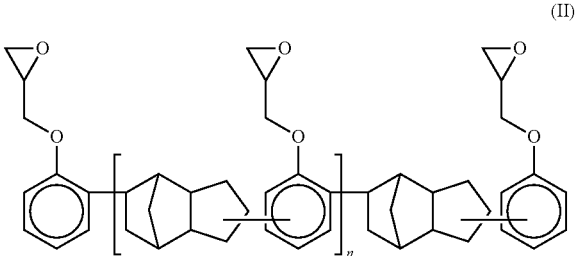

(II)

wherein in formula (II), n is an integer of 1 or more.

19. The epoxy resin composition as set forth in claim 18, wherein the change in glass transition temperature that occurs during storage at 40° C. and 75% RH for 14 days is 20° C. or less.

20. A prepreg comprising the epoxy resin composition as set forth in claim 18 and reinforcing fiber.

21. A fiber reinforced composite material produced by curing the prepreg as set forth in claim 20.

* * * * *